US006954592B2

(12) United States Patent
Tan et al.

(10) Patent No.: US 6,954,592 B2
(45) Date of Patent: Oct. 11, 2005

(54) SYSTEMS, METHODS AND APPARATUS FOR BI-DIRECTIONAL OPTICAL TRANSCEIVERS

(75) Inventors: Ronson Tan, Singapore (SG); Tat Ming Teo, Singapore (SG); Wenbin Jiang, Thousand Oaks, CA (US); Hsing Chung Lee, Calabasas, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/165,676

(22) Filed: Jun. 6, 2002

(65) Prior Publication Data

US 2004/0208601 A1 Oct. 21, 2004

Related U.S. Application Data

(60) Provisional application No. 60/351,862, filed on Jan. 24, 2002, and provisional application No. 60/351,831, filed on Jan. 24, 2002.

(51) Int. Cl.[7] .............................................. H04B 10/00
(52) U.S. Cl. ...................................... 398/138; 398/135
(58) Field of Search ............................... 385/24, 14, 45, 385/28, 33, 41, 42, 47, 85, 95, 88, 92–94; 398/135, 138, 139, 140, 164

(56) References Cited

U.S. PATENT DOCUMENTS

| | | |
|---|---|---|
| 2,187,908 A | 1/1940 | McCreary |
| 3,453,036 A | 1/1969 | Swope et al. .................. 350/96 |
| 3,504,182 A | 3/1970 | Pizzurro et al. |
| 3,704,061 A | 11/1972 | Travis .......................... 350/171 |
| 3,767,290 A | 10/1973 | Lang et al. .................. 350/173 |
| 3,859,536 A | 1/1975 | Thiel |
| 3,870,396 A | 3/1975 | Racki et al. |
| 3,870,398 A | 3/1975 | Love .......................... 350/96 C |
| 3,874,779 A | 4/1975 | Thiel ..................... 350/96 WG |
| 3,883,217 A | 5/1975 | Love et al. ................ 350/96 C |
| 3,901,582 A | 8/1975 | Milton ....................... 350/96 C |
| 3,902,786 A | 9/1975 | Brown ....................... 350/96 C |
| 3,933,410 A | 1/1976 | Milton ....................... 350/96 C |
| 3,937,560 A | 2/1976 | Milton ....................... 350/96 C |
| 3,977,764 A | 8/1976 | d'Auria et al. ............ 350/96 C |
| 4,011,005 A | 3/1977 | Hawkes et al. ............ 350/96 C |
| 4,054,366 A | 10/1977 | Barnoski et al. .......... 350/96 C |
| 4,130,345 A | 12/1978 | Doellner ................... 350/96.22 |
| 4,173,390 A | 11/1979 | Kach ........................ 350/96.16 |
| 4,176,908 A | 12/1979 | Wagner .................... 350/96.15 |
| 4,201,442 A | 5/1980 | McMahon et al. ....... 350/96.14 |
| 4,211,469 A | 7/1980 | Holzman .................. 350/96.16 |
| 4,229,066 A | 10/1980 | Rancourt et al. |
| 4,278,327 A | 7/1981 | McMahon et al. ....... 350/347 V |
| 4,301,543 A | 11/1981 | Palmer ........................ 455/612 |
| 4,306,765 A | 12/1981 | Winzer et al. ........... 350/96.16 |
| 4,339,290 A | 7/1982 | Winzer et al. .............. 156/159 |
| 4,362,358 A | 12/1982 | Hafle |
| 4,378,143 A | 3/1983 | Winzer .................... 350/96.15 |
| 4,381,882 A | 5/1983 | Sabine |
| 4,399,563 A | 8/1983 | Greenberg |

(Continued)

*Primary Examiner*—Jason Chan
*Assistant Examiner*—David C. Payne
(74) *Attorney, Agent, or Firm*—Allen, Dyer, Doppelt Milbrath & Gilchrist, P.A.

(57) ABSTRACT

An optical data link using a single optical fiber for bi-directional optical communication. Bi-direction optical transceivers couple to the single optical fiber having two optical channels of communication. An optical subassembly in each optical transceiver to multiplex an optical transmit signal and demultiplex an optical receive signal within the bi-direction optical transceiver. The optical subassembly includes an optical block with an optical filter to reflect at least one wavelength of light and to allow passage of another wavelength of light. Embodiments of the optical block with the optical filter are described.

53 Claims, 15 Drawing Sheets

U.S. PATENT DOCUMENTS

| | | | |
|---|---|---|---|
| 4,423,922 A | | 1/1984 | Porter |
| 4,516,828 A | | 5/1985 | Steele |
| 4,530,566 A | | 7/1985 | Smith et al. |
| 4,536,058 A | | 8/1985 | Shaw et al. .................. 350/320 |
| 4,611,884 A | | 9/1986 | Roberts |
| 4,621,895 A | | 11/1986 | Motsko ................... 350/96.21 |
| 4,626,065 A | | 12/1986 | Mori ....................... 350/96.15 |
| 4,654,844 A | | 3/1987 | Mandello |
| 4,668,044 A | | 5/1987 | D.Auria et al. |
| 4,671,613 A | | 6/1987 | Buhrer ....................... 350/174 |
| 4,693,544 A | | 9/1987 | Yamasaki et al. ......... 350/96.16 |
| 4,701,010 A | | 10/1987 | Roberts |
| 4,707,067 A | | 11/1987 | Haberland et al. |
| 4,720,171 A | | 1/1988 | Baker ..................... 350/331 R |
| 4,767,171 A | | 8/1988 | Keil et al. |
| 4,783,137 A | | 11/1988 | Kosman et al. |
| 4,824,200 A | | 4/1989 | Isono et al. ............... 350/96.16 |
| 4,948,229 A | | 8/1990 | Soref ...................... 350/96.18 |
| 4,982,083 A | * | 1/1991 | Graham et al. ........ 250/227.11 |
| 4,989,935 A | | 2/1991 | Stein |
| 5,005,935 A | | 4/1991 | Kunikane et al. |
| 5,026,134 A | | 6/1991 | Sugawara et al. |
| 5,026,137 A | | 6/1991 | Tokumitsu |
| 5,056,099 A | | 10/1991 | Bradley |
| 5,111,321 A | | 5/1992 | Patel ........................... 359/92 |
| 5,123,123 A | | 6/1992 | Hart et al. |
| 5,127,075 A | | 6/1992 | Althaus et al. |
| 5,159,190 A | | 10/1992 | Hohberg et al. |
| 5,225,942 A | | 7/1993 | Ikeno et al. ................. 359/836 |
| 5,241,417 A | | 8/1993 | Sekiguchi |
| 5,272,332 A | | 12/1993 | Ning |
| 5,278,929 A | | 1/1994 | Tanisawa et al. |
| 5,337,398 A | * | 8/1994 | Benzoni et al. ............... 385/90 |
| 5,341,238 A | | 8/1994 | Trost et al. |
| 5,347,605 A | | 9/1994 | Isaksson |
| 5,399,298 A | | 3/1995 | Kelly et al. |
| 5,408,559 A | | 4/1995 | Takahashi et al. |
| 5,410,431 A | | 4/1995 | Southwell |
| 5,463,707 A | | 10/1995 | Nakata et al. |
| 5,475,531 A | | 12/1995 | Rahmlow et al. |
| 5,477,350 A | | 12/1995 | Riza et al. ..................... 359/39 |
| 5,487,124 A | * | 1/1996 | Bowen et al. ................. 385/93 |
| 5,535,034 A | * | 7/1996 | Taniguchi ................... 398/139 |
| 5,546,212 A | | 8/1996 | Kunikane et al. |
| 5,552,918 A | * | 9/1996 | Krug et al. .................. 398/139 |
| 5,555,334 A | | 9/1996 | Ohnishi et al. |
| 5,661,602 A | | 8/1997 | Matsuda et al. |
| 5,663,821 A | * | 9/1997 | Suda et al. .................. 398/139 |
| 5,740,288 A | | 4/1998 | Pan ............................ 385/11 |
| 5,740,296 A | * | 4/1998 | Harris ........................ 385/116 |
| 5,748,812 A | | 5/1998 | Buchin ........................ 385/18 |
| 5,781,318 A | | 7/1998 | Tremblay |
| 5,796,899 A | | 8/1998 | Butrie et al. |
| 5,937,114 A | | 8/1999 | Fisher et al. |
| 6,040,934 A | * | 3/2000 | Ogusu et al. ............... 398/139 |
| 6,115,180 A | | 9/2000 | Hirai et al. |
| 6,142,680 A | | 11/2000 | Kikuchi et al. |
| 6,213,651 B1 | | 4/2001 | Jiang et al. |
| 6,278,549 B1 | | 8/2001 | Gaebe |
| 6,282,000 B1 | | 8/2001 | Kikuchi et al. |
| 6,282,025 B1 | | 8/2001 | Huang et al. ............... 359/495 |
| 6,493,121 B1 | * | 12/2002 | Althaus ...................... 398/135 |
| 6,498,875 B1 | | 12/2002 | Jiang et al. ................... 385/33 |
| 6,513,993 B1 | * | 2/2003 | Nakanishi et al. ............ 385/92 |
| 6,529,383 B1 | * | 3/2003 | Barringer et al. ........... 361/754 |
| 6,614,963 B2 | * | 9/2003 | Melchior et al. ............. 385/47 |
| 6,652,158 B2 | | 11/2003 | Bartur et al. |
| 6,668,113 B2 | | 12/2003 | Togami et al. |
| 2001/0021287 A1 | * | 9/2001 | Jewell et al. .................. 385/14 |
| 2001/0048793 A1 | * | 12/2001 | Dair et al. .................... 385/92 |
| 2003/0053770 A1 | * | 3/2003 | Noddings et al. ............. 385/95 |

* cited by examiner

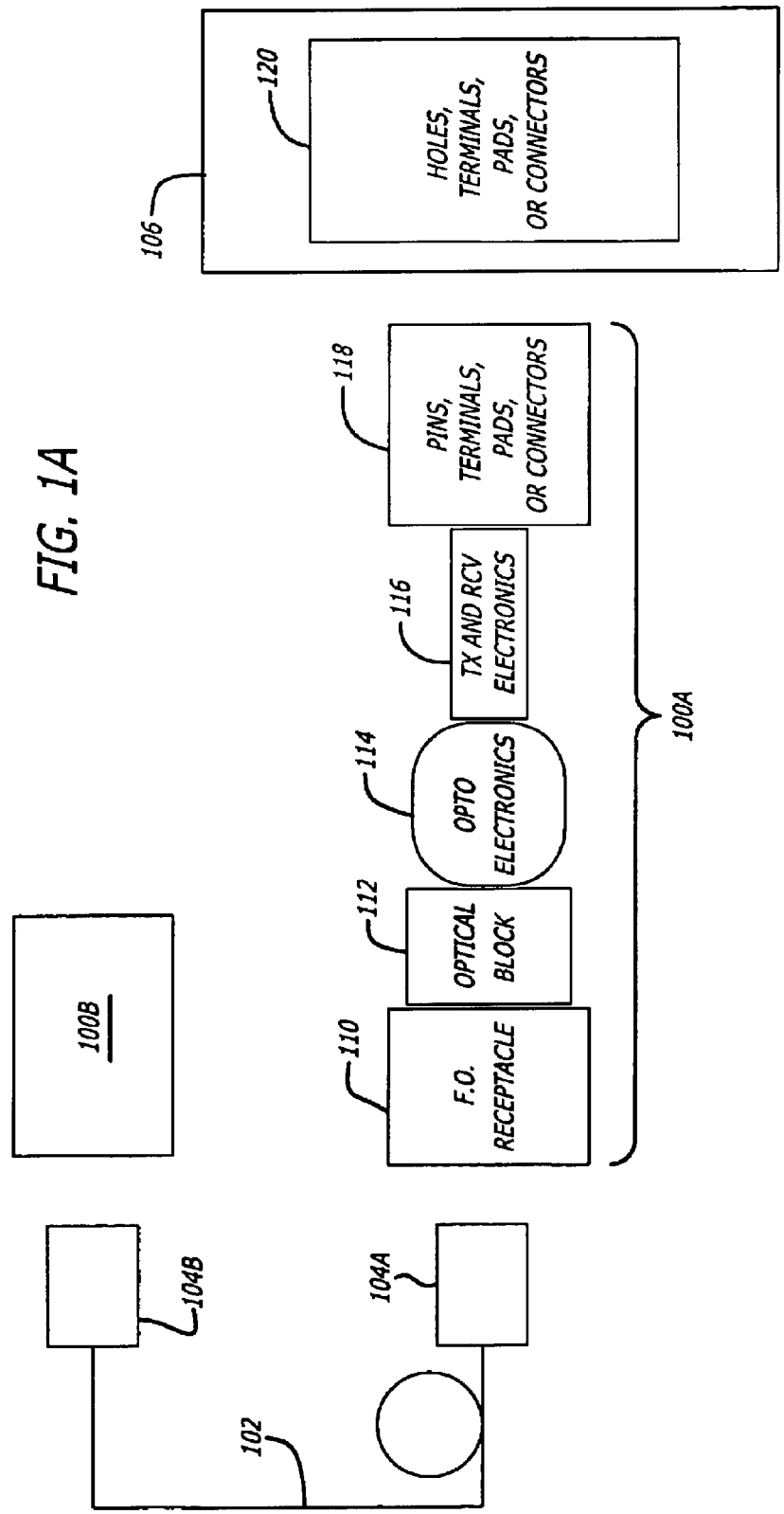

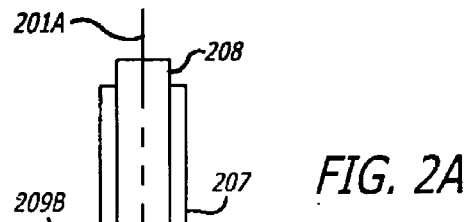
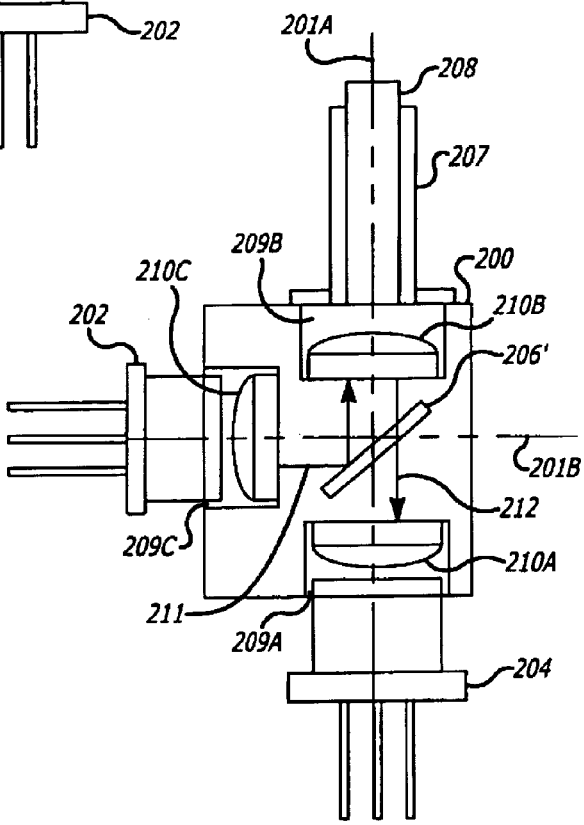

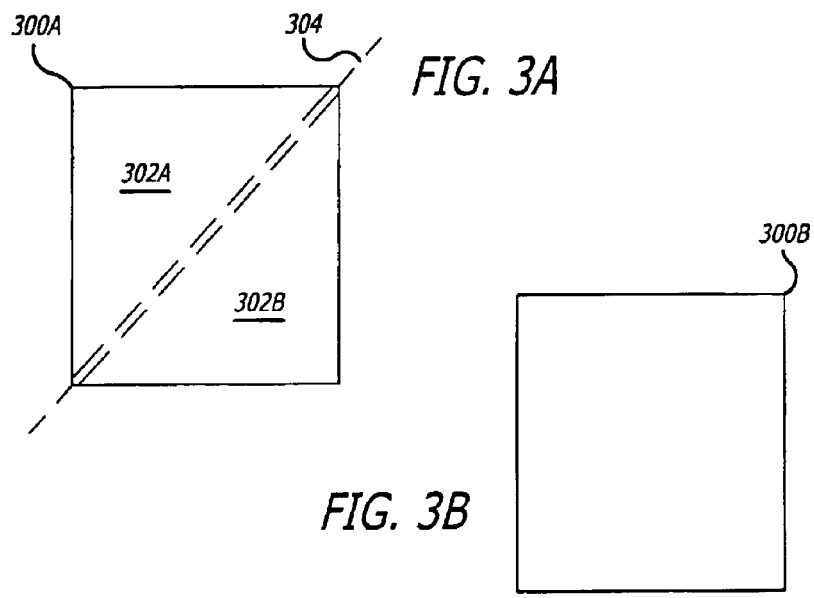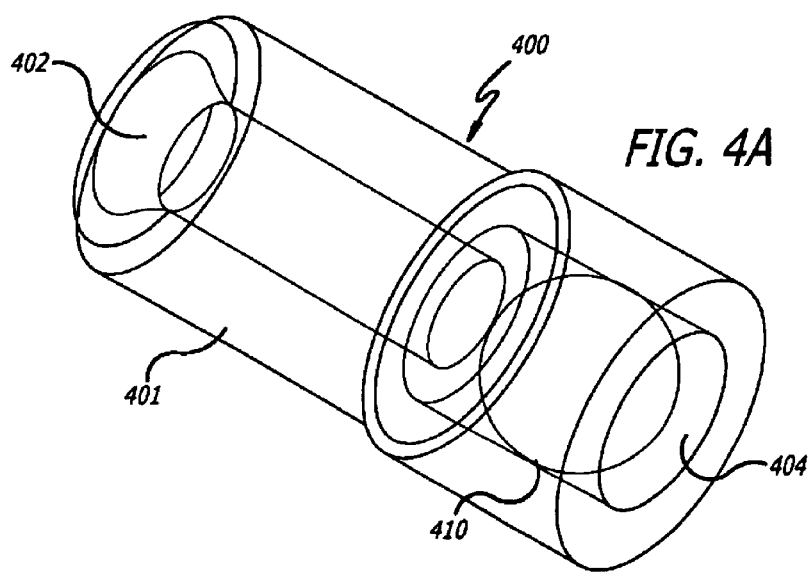

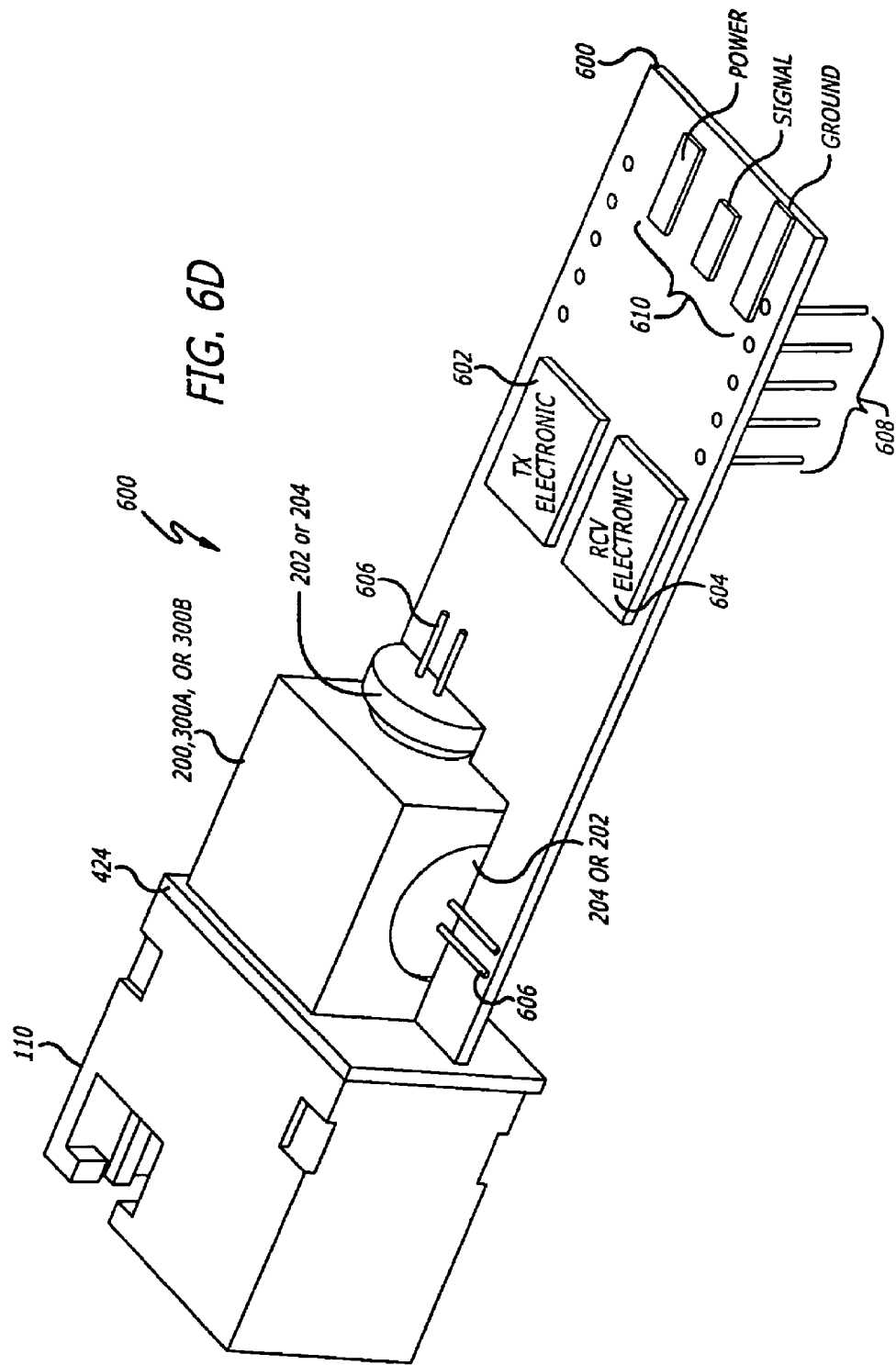

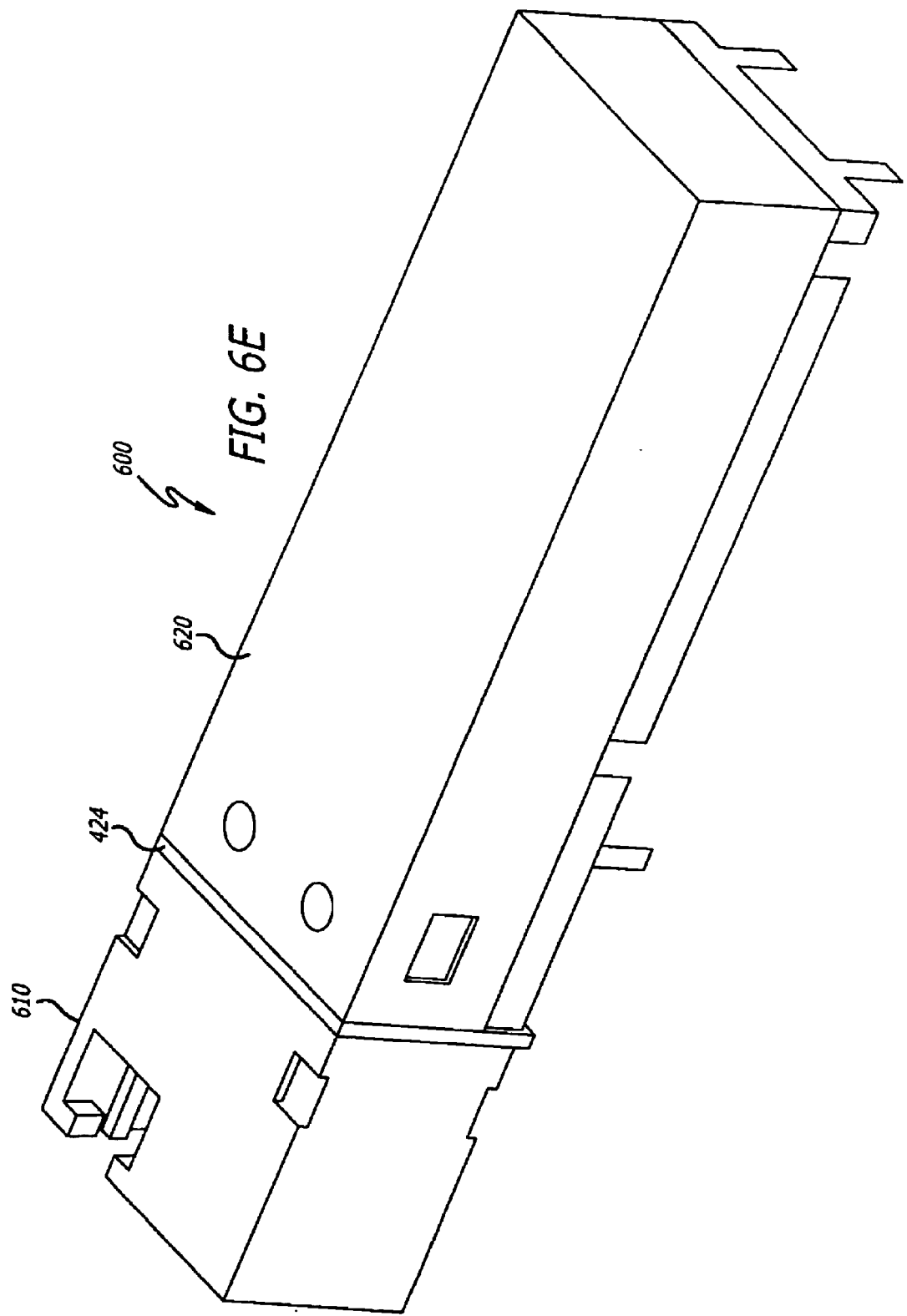

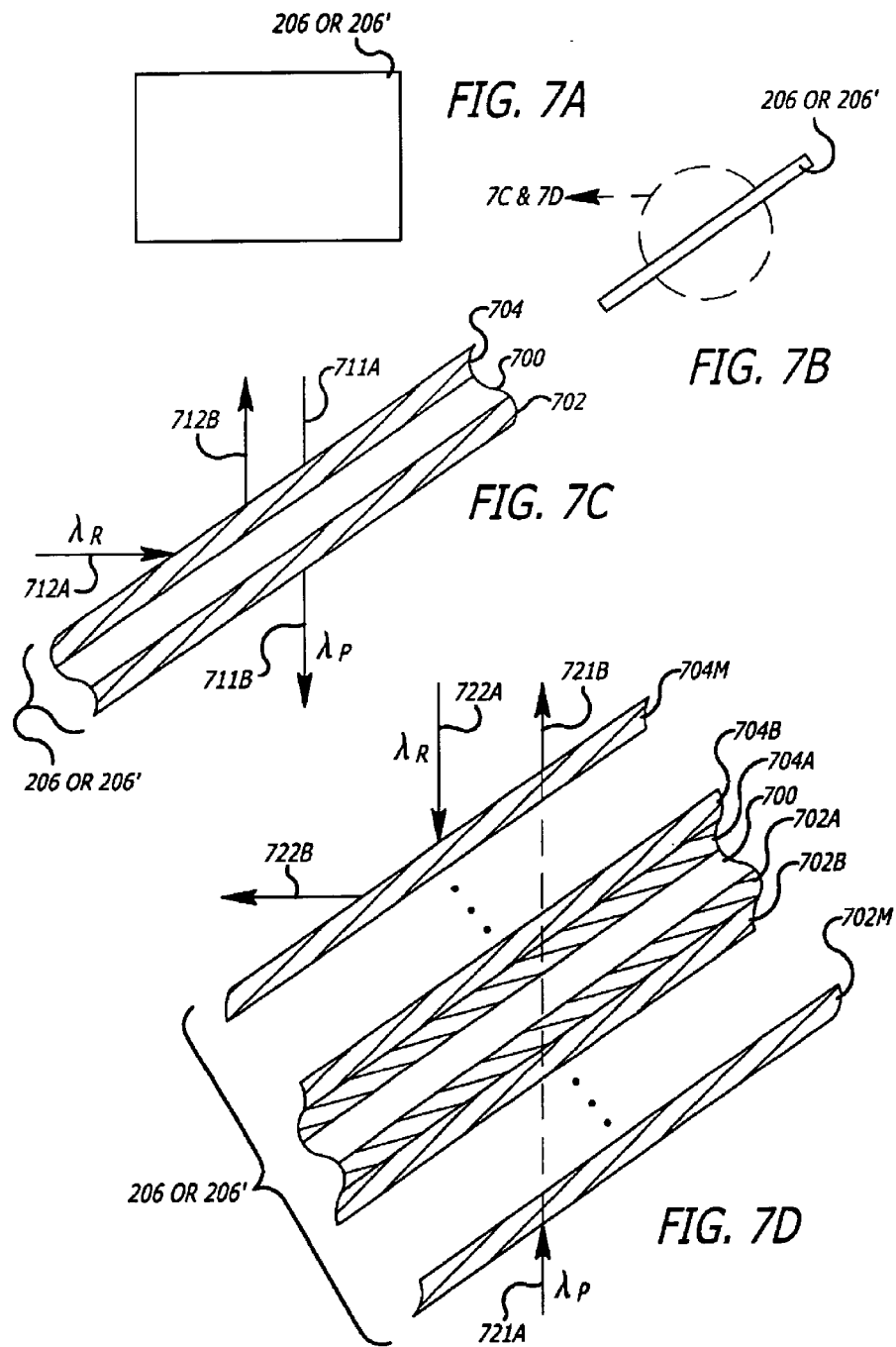

SYSTEMS, METHODS AND APPARATUS FOR BI-DIRECTIONAL OPTICAL TRANSCEIVERS

CROSS REFERENCE TO RELATED APPLICATIONS

This U.S. Non-Provisional Patent Application claims the benefit of U.S. Provisional Patent Application No. 60/351,862 entitled "BI-DIRECTIONAL OPTICAL TRANSCEIVER", filed Jan. 24, 2002 by Ronson Tan et al; and also claims the benefit of U.S. Provisional Patent Application No. 60/351,831 entitled "BI-DIRECTIONAL OPTICAL TRANSCEIVER", filed Jan. 24, 2002 by Ronson Tan et al.

FIELD OF THE INVENTION

The invention relates generally to the field of optical data links and optical transceiver modules. Particularly, the invention relates to mechanisms of coupling light into and out of fiber optic cables.

BACKGROUND OF THE INVENTION

For access network deployment, such as fiber to the home (FTTH) or fiber to the curb (FTTC), it is desirable to use only one fiber optic cable or wave guide in order to reduce costs. This is particularly so because the length of the cable may reach 20 kilometers in such deployments and a conventional approach, using a two-fiber transceiver with a duplex-fiber, would be much more costly. However, providing bi-directional communication over a single fiber optic cable using photons or light signals and over such distances is challenging.

In bi-directional communication over a single fiber optic cable, transmitting and receiving of photons or light signals is performed over the same single fiber optic cable or wave guide. In order to do so, the transmit data and receive data are multiplexed onto the same single fiber optic cable using two different wavelengths or frequencies of light. Input or transmit data is multiplexed onto the fiber optic cable while output or receive data is de-multiplexed from the fiber optic cable. The input or transmit data path using one wavelength of light is often referred to as the transmit channel. The output or receive data path using another wavelength of light is often referred to as the receive channel. Data is multiplexed onto the transmit channel and data is demultiplexed off of the output channel at each end of the single fiber optic cable.

At each end of a typical optical data link is an optical transceiver to transmit and receive data over the respective transmit and receive channels. The optical transceiver at each end needs to be capable of supporting bi-directional communication over a single fiber optic cable for such deployments. In order to provide efficient bi-directional communication over the same single fiber optic cable, it is desirable to minimize optical crosstalk between the transmit and receive channels while providing good coupling and minimal manufacturing costs in an optical transceiver.

BRIEF DESCRIPTION OF THE DRAWINGS

The features of the invention will become apparent from the following detailed description of the invention in which:

FIG. 1A is a block diagram of a typical optical data link.

FIGS. 2A–2B are cutaway views of embodiments of an optical subassembly including an optical block with components coupled thereto.

FIG. 3A is a block diagram of a clam shell method of forming an optical block.

FIG. 3B is a block diagram of a single or integrated method of forming an optical block.

FIGS. 4A–4G are diagrams illustrating the formation of a clam shell optical block for a bi-directional optical transceiver.

FIGS. 6A–6F are diagrams illustrating an exemplary assembly of a bi-directional optical transceiver.

FIGS. 7A–7D are illustrations of exemplary embodiments of an optical filter for use in the optical block.

Like reference numbers and designations in the drawings indicate like elements providing similar functionality.

DETAILED DESCRIPTION OF THE INVENTION

Figure 1B:
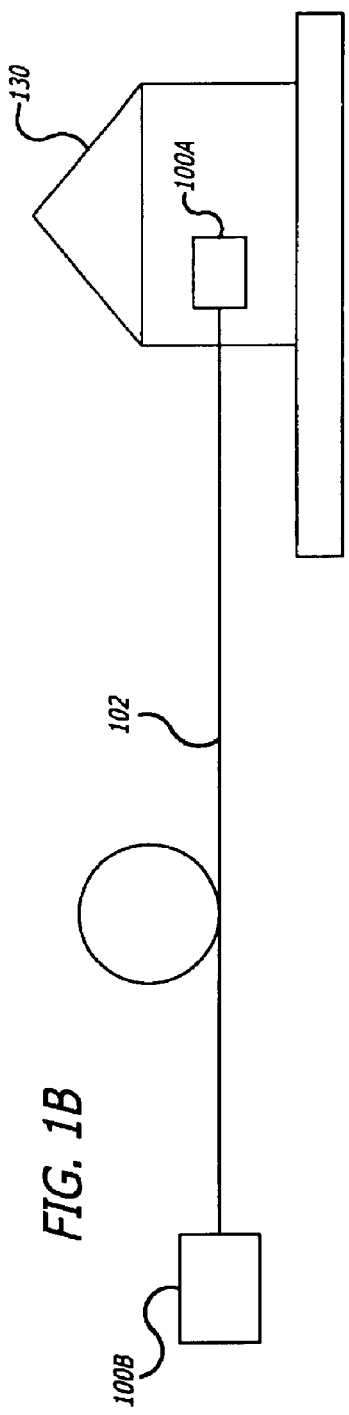
FIG. 1B is a diagram of a typical fiber to the home system.

In the following detailed description of the invention, numerous specific details are set forth in order to provide a thorough understanding of the invention. However, the invention may be practiced without these specific details. In other instances well known methods, procedures, components, and circuits have not been described in detail so as not to unnecessarily obscure aspects of the invention.

In an embodiment of the invention a low cost bi-directional optical transceiver is provided using plastic molding technology for an optical block of an optical sub-assembly (OSA). The bi-directional optical transceiver is more easily manufactured to lower cost and may be more reliable.

Referring now to FIG. 1A, a typical optical data link is illustrated. An optical data link includes an optical transceiver 100A, an optical transceiver 100B, and a single fiber optic cable 102. Each of the optical transceivers 100A and 100B are bi-directional optical transceivers to interface to a single optical fiber 102. The optical fiber 102 includes a first plug 104A and a second plug 104B. The typical block functional elements of the optical transceivers 100A includes a nose or fiber optic receptacle 110, an optical block 112, opto-electronics 114, transmit and receive electronics 116, and pins, terminals, pads, or connectors 118. The nose or fiber optic receptacle 110 receives the fiber optic plug 104A. The optical transceiver 100A make couple to a host system 106. In order to do so the host system 106 may include holes, terminals, pads, or connectors 120 to couple to the pins, terminals, pads, or connectors 118 respectfully of the optical transceivers 100A. The optical block 112 is for coupling light between the opto-electronics 114 and the optical fiber 102. The fiber optical receptacle 110 holds the plug 104A in alignment with the optical block. The opto-electronics 114 transduces between electrical signals (e.g., voltage or current) and optical signals (e.g., light or photons). The transmit and receive electronics 116 appropriately controls the opto-electronics 114 to generate lights signals or receive light signals as well as transceive electrical signals through the pins, terminals, pads, or connectors 118. The pins, terminals, pads, or connectors 118 of the optical transceiver are for coupling to the host system 106.

Referring now to FIG. 1B, a fiber to the home (FTTH) system is illustrated. The optical fiber 102 couples to the optical transceiver 100A within the house 130. The optical transceiver 100B at the other end of the optical fiber 102 is part of the optical network of the optical service provider (OSP).

Figure 1C:
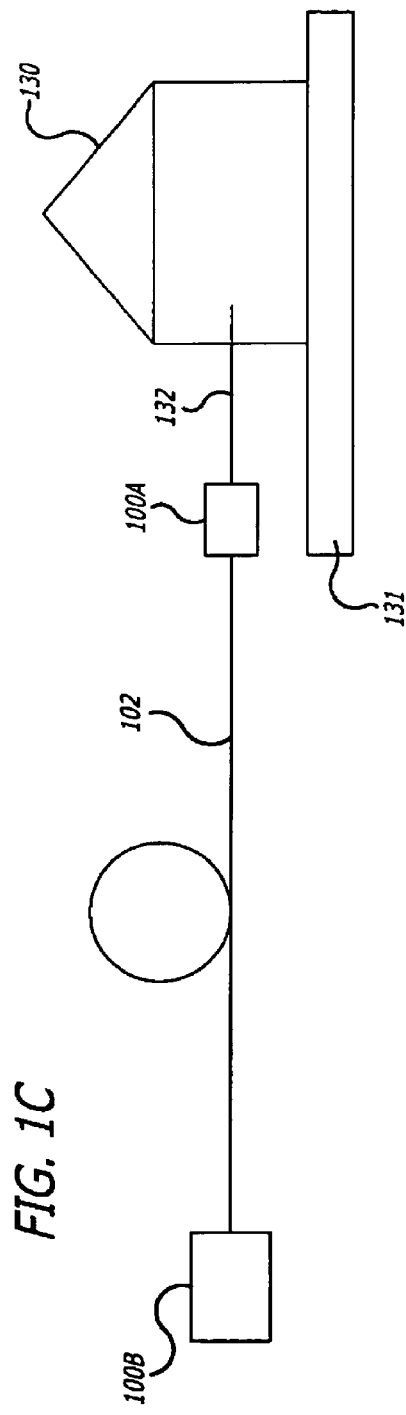
FIG. 1C is a diagram of a typical fiber to the curb system.

Referring now to FIG. 1C, a fiber to the curb (FTTC) system is illustrated. The optical fiber 102 couples to the optical transceiver 100A at the curb 131. From the optical transceiver 100A at the curb 131, an electrical connection 132 is made into the house 130.

For access network deployment, such as the fiber to the home (FTTH) system or fiber to the curb (FTTC) system, it is desirable to have a single mode optical transceiver coupling to one single mode optical fiber to reduce the fiber deployment cost. The distance of such a deployment may reach 20 km. The upload (transmitting) and down-load (receiving) are accomplished using the same single mode optical fiber 102. In one embodiment, the two wavelengths for the two channels over the single mode optical fiber are 1310 nanometer (nm) and 1550 nm wavelengths. The light source or transmitter for the ONU (optical network unit, i.e. the transceiver 100A) on customer premises (i.e. at the home 130) is 1310 nm wavelength. The light source or transmitter for the OLT (optical line terminal, i.e., the transceiver 100B) on the optical network service provider side is 1550 nm. The two wavelengths allow decoupling or demultiplexing of the two channels in the optical transceivers 100A and 100B. That is while the light receivers may be the same in transceivers 100A and 100B because they may receive a broad range of frequencies, the light sources or transmitters will operate at different center wavelengths to allow multiplexing and demultiplexing of data over two optical communication channels in a single optical fiber. In another embodiment, the single optical fiber is a multimode optical fiber and not a single mode optical fiber.

Generally in an optical communication system with a pair of optical transceivers at each end including the invention, a first light source on a first end of the single optical fiber can generate light or photons having a wavelength from 1200 nm to 1400 nm and a second light source on a second end of the single optical fiber can generate light or photons having a wavelength from 1450 nm to 1650 nm. A first light receiver on the first end can receive the light or photons having the wavelength from 1450 nm to 1650 nm from the second light source. A second light receiver on the second end can receive the light or photons having the wavelength from 1200 nm to 1400 nm from the first light source. Each of the optical transceivers includes an optical subassembly which includes an optical block having an optical filter.

The optical block has a slot to hold the optical filter in alignment with optical axes of the optical block. At one end of the optical communication system, the optical filter is transparent to the light or photons of the first light source and reflective to the light or photons of the second light source. At an opposite end of the optical communication system, the optical filter is transparent to the light or photons of the second light source and reflective to the light or photons of the first light source.

FIG. 2A illustrates an optical subassembly (OSA) including an optical block 200 with a light source or transmitter (TX) 202, a light receiver or photodetector (RX) 204, an optical filter 206, an optical port 207 including a ferrule 208, three optical block openings 209A–209C, and lenses 210A–210C coupled together as shown. The optical block 200 includes a slot to hold the optical filter 206. In a preferred embodiment, the optical block 200 is formed of a solid material such as plastic. Alternatively, the optical block 200 may be formed of any solid material such as glass, metal, ceramic, or any other solid. The solid material forming the optical block is provided with openings, cavities and a slot which are either clear of material and/or optically transparent to light along light paths of optical axes. In one embodiment, the optical block is formed by molding the material, such as plastic into a molded plastic. In another embodiment, the optical block is formed by etching, or drilling, and/or cutting the material. During assembly of the optical block 200, an opening allows the filter 206 to be inserted into the slot in one embodiment. That is, the optical block 200 may be considered to include the optical filter 206.

The slot in the optical block orients the optical filter 206 with the optical axis of the light transmitter 202, the light receiver 204, and the single optical fiber which couples to the optical port 207 and the ferrule 208. In one embodiment, the optical filter 206 and the port or openings in the optical block are oriented such that the angle of incidence with the optical axis of the optical fiber is forty five degrees. With reorientation of the optical filter and the port or openings in the optical block, other angles of incidence with the optical axis of the optical fiber may be achieved.

In one embodiment, the filter 206 is transparent or transmissive to an outgoing light or transmission light beam (indicated by arrow 211) having one center wavelength, such as 1310 nm for example, which is generated by the light source 202. The transmission light beam 211 represents an optical transmit signal. At the same time, the filter 206 is reflective to the incoming light or receiving light beam (indicated by arrow 212) having a different center wavelength, such as 1550 nm for example. The receiving light beam 212 represents an optical receive signal. The center wavelength of the receiving light beam 212, which is to be received by the light receiver 204, is generated by a different transmitter at the opposite end of the communication channel.

The transmission light beam 211 and the receiving light beam 212 have the same optical axis 201A with the single optical fiber 208 for bi-directional communication therein. However, the light source 202 and light receiver 204 are aligned within the optical block 200 to different optical axes. In one embodiment, the light source 202 and the light receiver 204 have optical axes substantially perpendicular to one another. The light source 202 may be aligned with the optical axis 201A over which the transmission light beam 211 may propagate. The light receiver 204 may be aligned with the optical axis 201B into which the receiving light beam 212 is redirected by the optical filter 206, by its reflecting surface for example.

Referring now to FIG. 2B, the light source 202 and light receiver 204 may alternatively be swapped and a different optical filter 206' utilized as is illustrated. In this case, the transmission light beam 211 is redirected by the optical filter 206 from the optical axis 201B into the optical axis 201A by the optical filter 206' while the receiving light beam 212 remains aligned with the optical axis 201A through the optical filter 206'. The optical axis of lenses 210A and 210B are aligned with the optical axis 201A. The optical axis of the ferrule 208 is aligned with the optical axis 201A. The optical axis of lens 210C is aligned with the optical axis 201B.

An optical transceiver having a filter with the exemplary reflective and transmissive wavelengths may be used in the optical network unit (ONU) on customer premises for example. In an alternate exemplary embodiment, the filter 206 or 206' may be made transparent to light at a wavelength of 1550 nm and reflective to light at a wavelength of 1310 nm for use in the OLT with a light source generating a light beam at a wavelength of 1550 nm.

The filter 206 and 206' can be formed out of a glass and have standard dielectric coating materials to allow transmission of light at one wavelength while reflecting light of another wavelength. That is, the optical filter 206 may be a coated glass which allows high transmission of light around one center wavelength (such as 1310 nm for example) and high reflection of light around a different center wavelength (such as 1550 nm for example). Alternatively, any other film on a rigid substrate with the right transmission and reflection characteristics may be used. Note that the filter may not be opaque or clear and transmissive for more than the one center frequency or wavelength of light which may or may not be in the visible spectrum of light.

Referring momentarily to FIGS. 7A–7D, views of an exemplary optical filter 206 or 206' are illustrated. FIG. 7A illustrates a front view of the optical filter 206 or 206'. FIG. 7B illustrates a top view of the optical filter 206 or 206'. The optical filter 206 or 206' may be square or rectangular as illustrated to be inserted into an square or rectangular slot, respectively. Alternatively, the optical filter may be oval or round to be inserted into an oval or round slot, respectively.

FIG. 7C illustrates a magnified view of an embodiment of the optical filter 206 or 206'. The optical filter 206 or 206' includes a substrate material 700, such as glass, quartz, or plastic, and a first material layer 702 and/or a second material layer 704 on either side or both sides of the substrate material 700. That is, the optical filter 206 or 206' illustrated in FIG. 7C may include the substrate 700 and the material layer 702, the substrate 700 and the material layer 704, or the substrate 700 and the materials layers 702 and 704. Each of the material layers 702 and/or 704 may be formed of a thickness proportional to the wavelengths of the light that desire reflecting and/or transmission. The material layers 702 and/or 704 may be standard dielectric coating materials to allow transmission of light at one wavelength while reflecting light of another wavelength.

The material layer 702 and or the material layer 704 provides reflection for an incoming light beam 712a of a first wavelength ($\lambda_R$) into the reflected output light beam 712b. The material layer 702 and or the material layer 704 allows an incoming light beam 711a of a second wavelength ($\lambda_p$) to pass through the optical filter 206 or 206' as the output light beam 711b.

FIG. 7D illustrates a magnified view of another embodiment of the optical filter 206 or 206'. The optical filter 206 or 206' includes a substrate material 700, such as glass or plastic, and a first plurality of pairs of alternating material layers 702a–702n and/or a second plurality of alternating pairs of material layers 704a–704n on either side or both sides of the substrate material 700. That is, the optical filter 206 or 206' illustrated in FIG. 7D may include the substrate 700 and the first plurality of pairs of alternating material layers 702a–702n, the substrate 700 and the plurality of alternating pairs of material layers 704a–704n, or the substrate 700 and the plurality of alternating pairs of material layers 702a–702n and 704a–704n on each respective side of the substrate. Each of the plurality of alternating pairs of material layers 702a–702n and/or 704a–704n may be formed of a thickness proportional to the wavelengths of the light that desire reflecting and/or transmission. The alternating pairs of material layers 702a–702n and/or 704a–704n may be standard dielectric coating materials to allow transmission of light at one wavelength while reflecting light of another wavelength.

The plurality of alternating pairs of material layers 702a–702n and/or the plurality of alternating pairs of material layers 704a–704n provide reflection for an incoming light beam 722a of a first wavelength ($\lambda_R$) into the reflected output light beam 722b. The plurality of alternating pairs of material layers 702a–702n and or the plurality of alternating pairs of material layers 704a–704n allow an incoming light beam 721a of a second wavelength ($\lambda_p$) to pass through the optical filter 206 or 206' as the output light beam 721b.

Exemplary optical filters are described in U.S. Pat. Nos. 5,241,417; 5,341,238; 5,399,298; 6,115,180; and 6,278,549. Other exemplary means that may be used to provide optical filtering are described in U.S. Pat. Nos. 4,229,066; 5,056,099; 5,272,332; 5,410,431; and 5,475,531; and 5,661,602.

Referring back to FIGS. 2A–2B, the light source (TX) 202 and light receiver (RX) 204 are optoelectronic devices to transduce between light signals and electrical signals. That is, the light source (TX) 202 transduces electrical signals into light signals and the light receiver (RX) 204 transduces light signals into electrical signals. The light source 202 may also be referred to as an optical transmitter, a light transmitter, or an optoelectronic transmitter, such as a laser. The light receiver 204 may also be referred to as an optical receiver, a light receiver, or an optoelectronic receiver, such as a photodiode.

The light source (TX) 202 is a packaged transmission light source, such as a semiconductor laser. The light source (TX) 202 is coupled into or adjacent the optical block opening or port 209A. The light source (TX) 202 may use various packages for protection and assembly including a TO-can, a leadframe package or other packaging type. In one embodiment, the light source (TX) 202 is a 1310 nm or 1550 nm Fabry Perot or distributed feedback (DFB) laser packaged in a TO-can or other type of package, such as a leadframe package. A vertical cavity surface emitting laser (VCSEL), an edge emitting semiconductor laser, or a light emitting diode (LED) may also be used as the light source 202 having similar types of packaging.

The light source (TX) 202 may generate a wavelength of photons or light around a center wavelength, such as around 1310 nm or 1550 nm, similar to a carrier frequency of a radio or television station.

The light receiver (RX) 204 is a packaged light receiver such as a semiconductor photodiode or photodetector. The light receiver (RX) 204 is coupled into or adjacent the optical block opening or port 209C. The light receiver (RX) 204 may be a packaged PIN photodiode or APD photodiode made of InGaAsP materials for example, or any other semiconductor materials that are responsive to the wavelength of interest. The light receiver (RX) 204 may use various packages for protection and assembly including a TO-can, a leadframe package or other packaging type.

The lenses 210A–210C are molded into the optical block 200 in one embodiment. The lenses 210A–210C may be spherical or aspherical lenses having similar curvatures. In alternative embodiments, discrete lenses may be formed and separately packaged and inserted into the ports or openings 209A–209C of the optical block or alternatively integrated with the packages of the light source 202 or the light receiver 204 which are then inserted into or coupled adjacent the ports or openings 209A and 209C of the optical block 200.

The ports or openings 209A–209C of the optical block 200 may each include a metal sleeve molded therein. Each metal sleeve may be used to respectively couple to the light source, the light receiver, or the optical port 207.

The fiber ferrule or optical ferrule 208 of the optical port 207 is a single mode optical ferrule in one embodiment to interface with a single mode optical fiber. In an alternate embodiment, the optical ferrule may be a multimode optical ferrule to couple to a multimode optical fiber. The optical ferrule is attached or coupled at one end to the optical block 200 and aligned with both the light source (TX) 202 and the light receiver (RX) 204 with single mode coupling accuracy in one embodiment. The optical ferrule may be epoxy bonded to the optical port 207 and/or opening 209B. Alternatively, the optical ferrule may be welded to the optical port 207 and/or opening 209B. The opposite end of the ferrule is to interface with a fiber optic connector of the optical fiber 102, such as an MU, SC or LC standard fiber optic connector. With a single optical fiber 102 for bi-directional communication, the fiber optic connector at the end thereof is a simplex fiber optic connector for coupling to the bi-directional optical transceiver.

The light source (TX) 202, the light receiver (RX) 204, and the ferrule 208 are aligned to each other through the lenses 210A–210C and permanently attached or coupled to the molded optical block 200 using an epoxy or other glue in a preferred embodiment. Using an epoxy or other glue to couple the optical components in this manner provides a low cost of manufacture during the assembly of the optical block 200.

An alternative embodiment of assembly of the optical block 200 may incorporate metal sleeves molded into the three optical block openings 209A–209C during the molding process. The light source (TX) 202, the light receiver (RX) 204, and the ferrule 208 may be welded to the metal sleeve without the use of epoxy. Assembly using this approach costs more, but is offset by the OSA being made of molding plastic which is a large portion of the costs.

There are two embodiments disclosed herein for the assembly, formation or construction of optical subassemblies including an optical block to support bidirectional optical communication over a single optical fiber.

FIG. 3A is a block diagram of a clam shell design of an optical block 300A. The optical block 300A includes a first half 302A and a second half 302B. The first half 302A and second half 302B couple along a diagonal plane 304 of the optical block 300A. In this case, the slot to hold the optical filter is also a clam shell design. The optical filter 206 or 206' is placed in a recessed slot on a first half of the optical block, and is encapsulated by a second half of the optical block. The first half 302A and the second half 302B of the clam shell optical block 300A may be held together by chemical bonding and the principle of geometric interference with epoxy.

FIG. 3B is a block diagram of a unitary, integrated, single, or one-piece design of an optical block 300B. The optical block 300B is not formed of halves but has cavities and other openings formed therein into which components may be placed for assembly with the optical block to complete an optical subassembly. In this case, the slot is formed in the one-piece optical block 300B. In which case, the optical filter is dropped into the slot in the optical block 300B and may be held firmly in place by chemical bonding and the principle of geometric interference using epoxy.

The assembly of an optical subassembly including the optical block 300A is shown in FIGS. 4A–4G, with two halves to encapsulate an optical filter 206.

In FIG. 4A, an optical port assembly 400 is formed. The optical port assembly 400 includes a hollow cylindrical body 401 with an opening or port 402 at a first end and a lens opening 404 at a second end. The opening 402 and the lens opening 404 are clear of material or optically transparent to light along a light path of the optical axis. The opening 402 may accept a ferrule. The opening 404 accepts a ball lens 410 which is pressed into the opening 404. Ball lens 410 provides similar function to the lens 210B previously described. Ball lens 410 is a lens in the shape of a ball and is optically transparent to the light of the desired wavelengths in order to properly focus it.

Figure 4B:
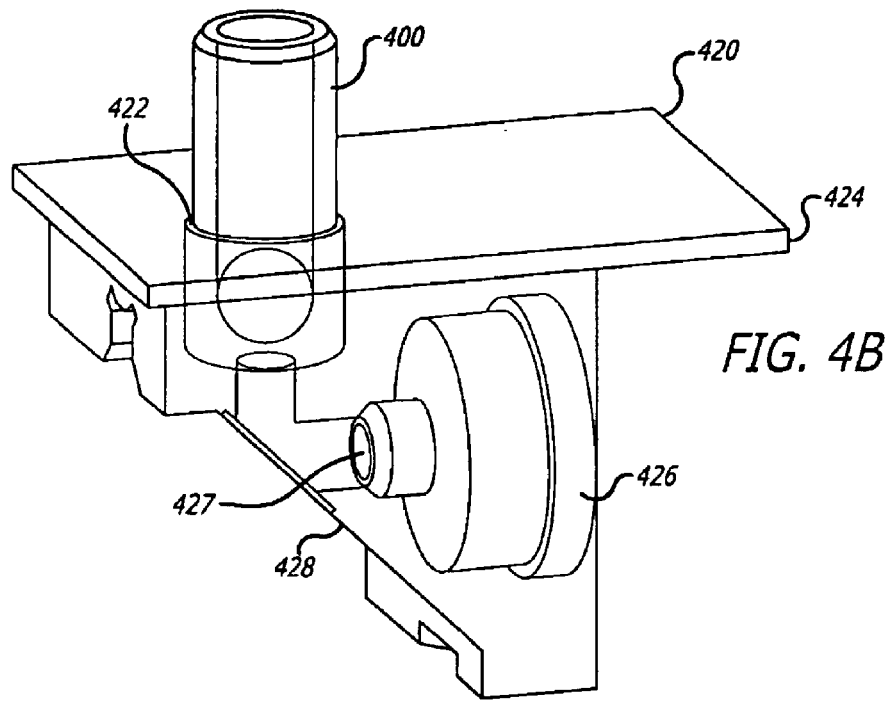

In FIG. 4B, the optical port assembly 400 is assembled to a female optical block half 420 by pressing it into an opening 422. The female optical block half 420 includes a flange 424 to mate with a nose or fiber optic receptacle 110 and align thereto. The female optical block half 420 further includes an opening 426 to accept a light source or light receiver. Additionally, the female optical block half 420 includes a lens opening 427 within the opening 426. The opening 426 and the lens opening 427 are clear of material or optically transparent to light along a light path of the optical axis. The female optical block half 420 has a diagonal plane 428 on one side to mate with a diagonal plane in a male optical block half.

Figure 4C:
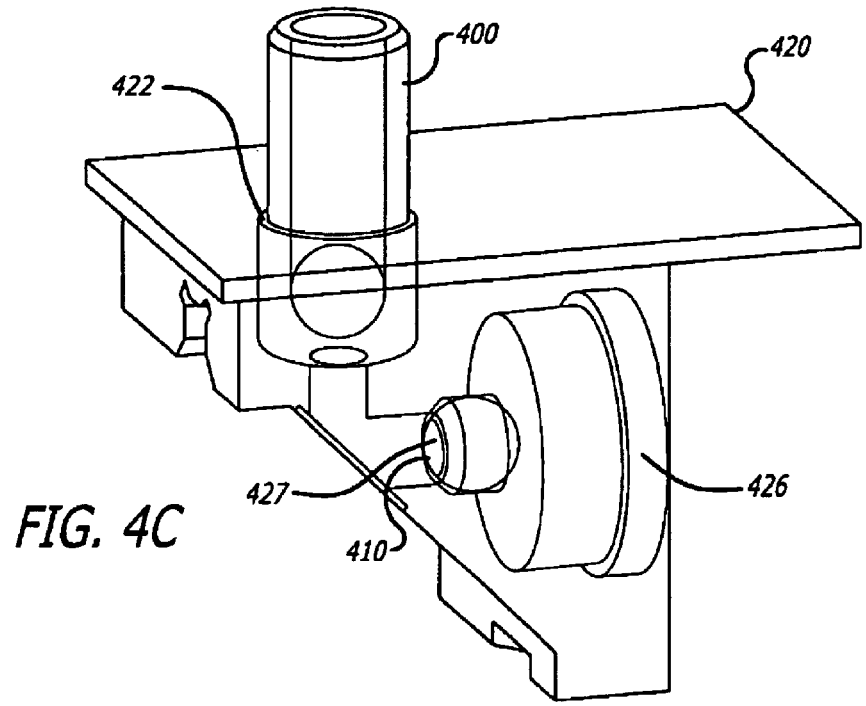

In FIG. 4C, a second ball lens 410 is inserted into the lens opening 427 in the female optical block half 420. The lens opening 427 is clear of material or optically transparent to light along a light path of the optical axis. The ball lens 410 provides similar functionality to the lens 210C previously described and is optically transparent to the light of the desired wavelength.

Figure 4D:
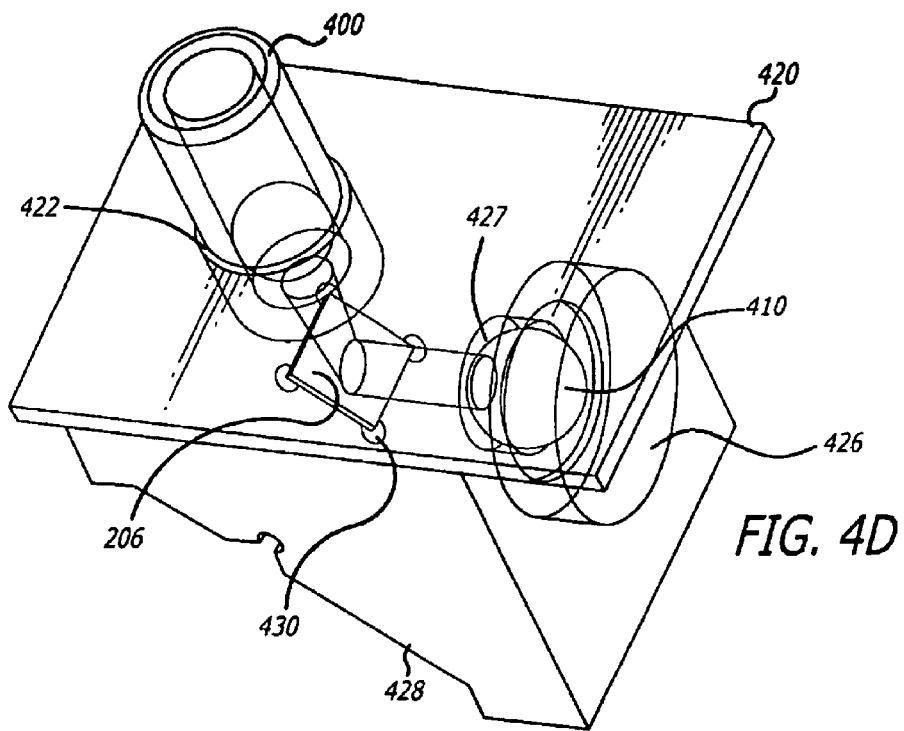

In FIG. 4D, a bottom view of the female optical block half 420, an optical filter 206 is inserted into a slot 430 in the female optical block half 420. The slot 430 is clear of material or optically transparent to light along light paths of the optical axes. As previously described, the optical filter 206 is transmissive or transparent to at least a first wavelength of light while its reflective to at least a second wavelength of light differing from the first. In this manner, the light of the first wavelength can pass through the optical filter 206 while the light of the second wavelength can be reflected by the optical filter.

Figure 4E:
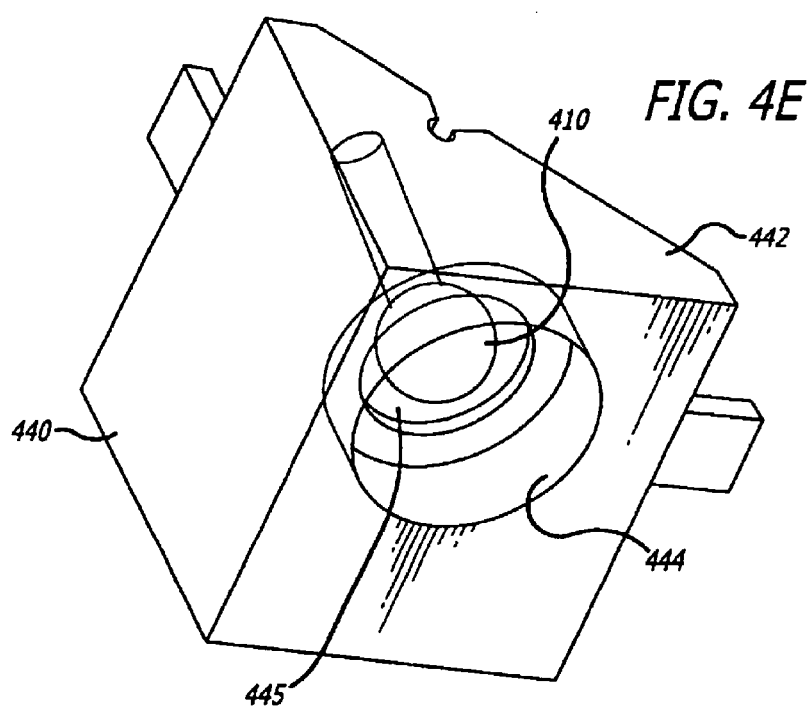

In FIG. 4E, a top view of the male optical block half 440 is illustrated. The male optical block half 440 has a diagonal plane 442 to mate with the diagonal plane 428 in the female optical block half 420. The male optical block half 440 includes an opening 444 to receive a light source or a light receiver. A lens opening 445 is formed in the male optical block half 440 within the opening 444. The opening 444 and the lens opening 445 are clear of material or optically transparent to light along a light path of the optical axis. A third ball lens 410 is inserted into the lens opening 445 in the male optical block half 440. The third ball lens 410 provides similar functionality to the lens 210A previously described and is optically transparent to the light of the desired wavelength.

Figure 4F:
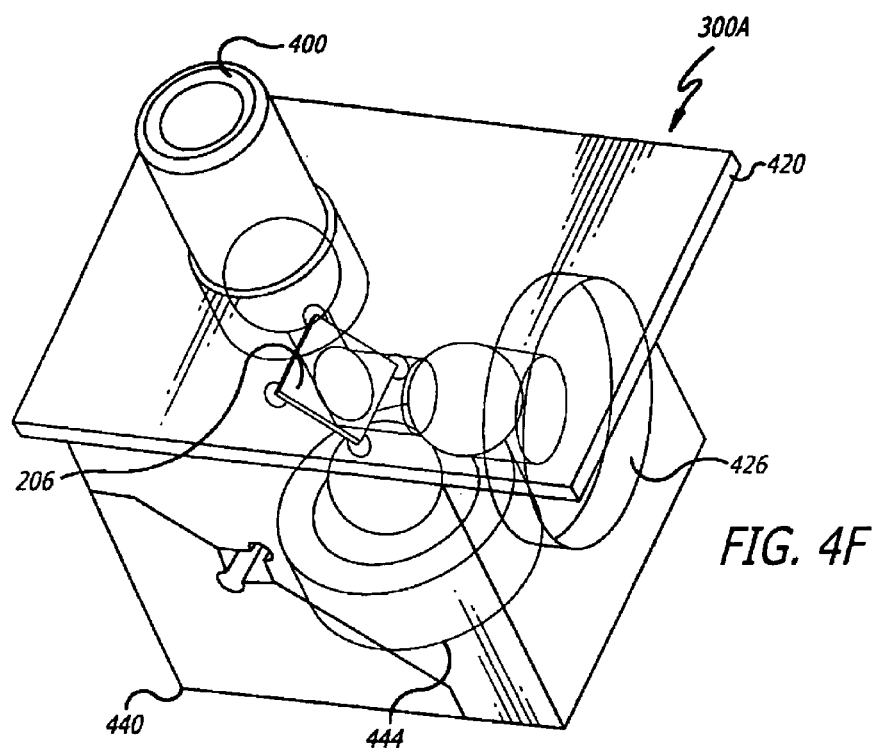

In FIG. 4F, the male optical block half 440 and the female optical block half 420 are joined or coupled together. The male optical block half 440 and the female optical block half 420 may be formed to snap together to form the optical block 300A. Otherwise, an epoxy or glue along the diagonal planes 442 and 428 may be used to hold the male optical block half 440 and the female optical block half 420 together as the optical block 300A.

Figure 4G:
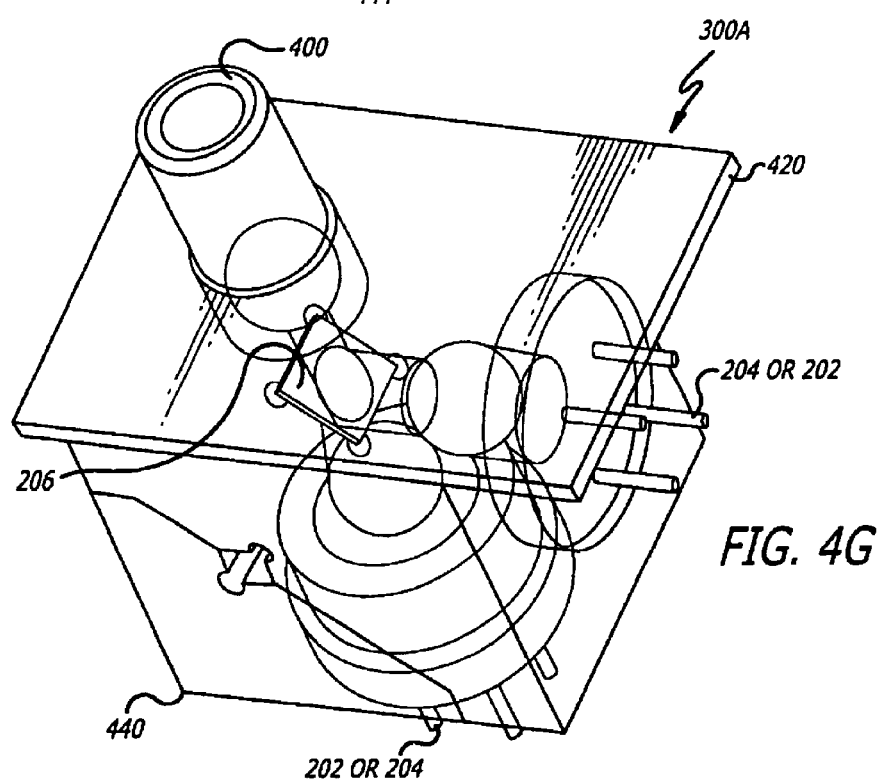

In FIG. 4G, the light source 202 and the light receiver 204 are coupled into openings of the optical block 300A and aligned therein. In one embodiment, the light source 202 and the light receiver 204 are coupled into openings 426 and 444 respectively. In another embodiment, the light source 202 and the light receiver 204 are coupled into openings 444 and 426 respectively. The light source 202 and the light receiver 204 may be coupled into openings of the optical block 300A with an epoxy or glue, aligned and allowed to cure in a fixed position. Alternatively, the light source 202 and the light receiver 204 may be aligned and welded in the openings or ports of the optical block 300A.

Assembly of a second embodiment of an optical subassembly including the optical block 300B is shown in FIGS. 5A–5E in which a one piece optical block design includes a slot for inserting the optical filter 206.

Figure 5A:
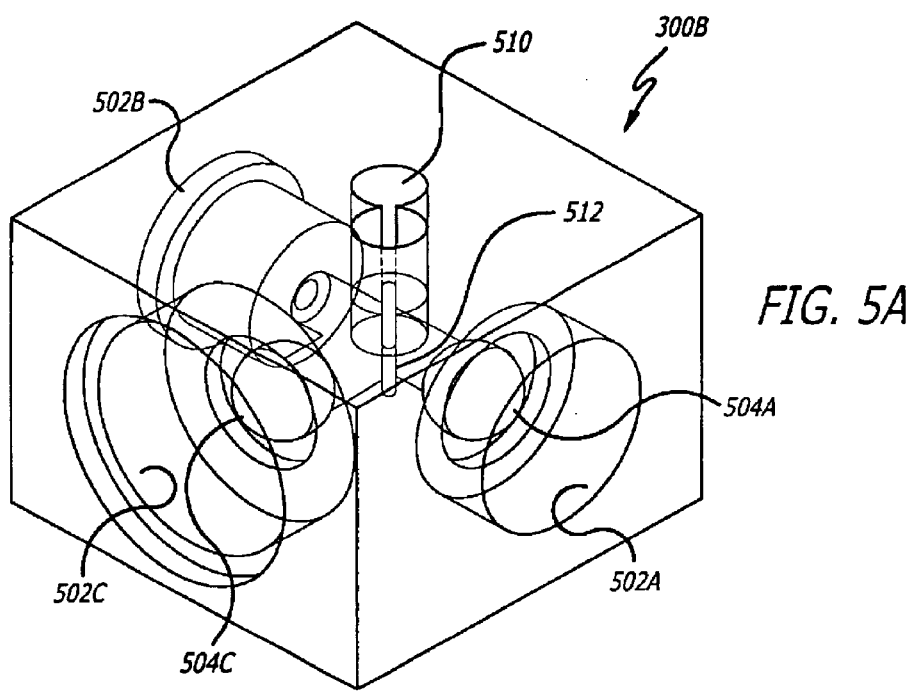
FIGS. 5A–5E are diagrams illustrating the formation of a single or integrated optical block for a bi-directional optical transceiver.

In FIG. 5A, a first perspective view, the optical block 300B includes openings 502A–502C. The openings 502A–502C are clear of material or optically transparent to light along light paths of the optical axes. Lenses 504A and 504C are pressed into lens openings within the respective port openings 502A and 502C. The lens openings of the optical block 300B are either clear of material or optically transparent to light along light paths of the optical axes. Lenses 504A–504C are optically transparent to light of the desired wavelength in order to focus it properly along the optical axes. The optical block 300B further includes an opening 510 and a slot 512 which are clear of material to receive an optical filter 206.

Figure 5B:
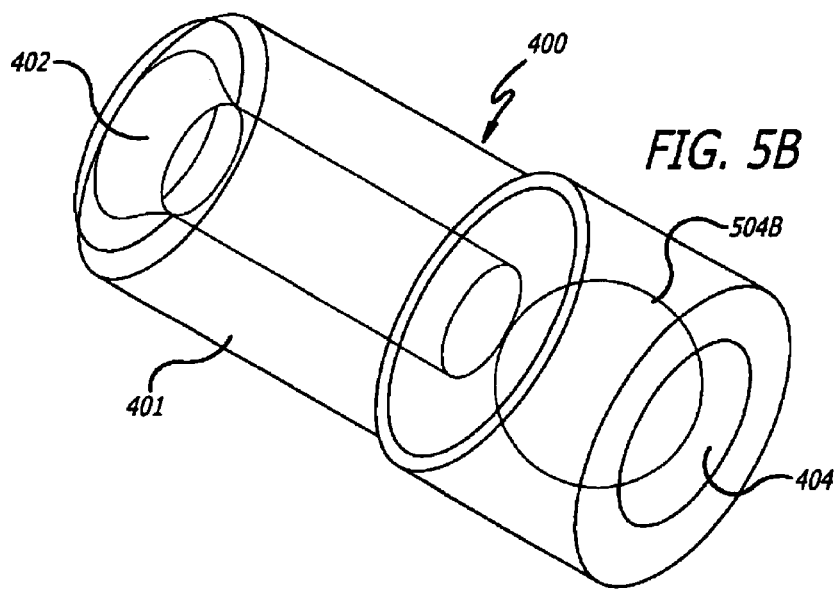

In FIG. 5B, a lens 504B is pressed into the port 404 of the optical port assembly 400. The lens 504B may be a ball lens 410 or another lens which is similar to lenses 504A and 504C. The optical port assembly 400 was previously described above in more detail.

Figure 5C:
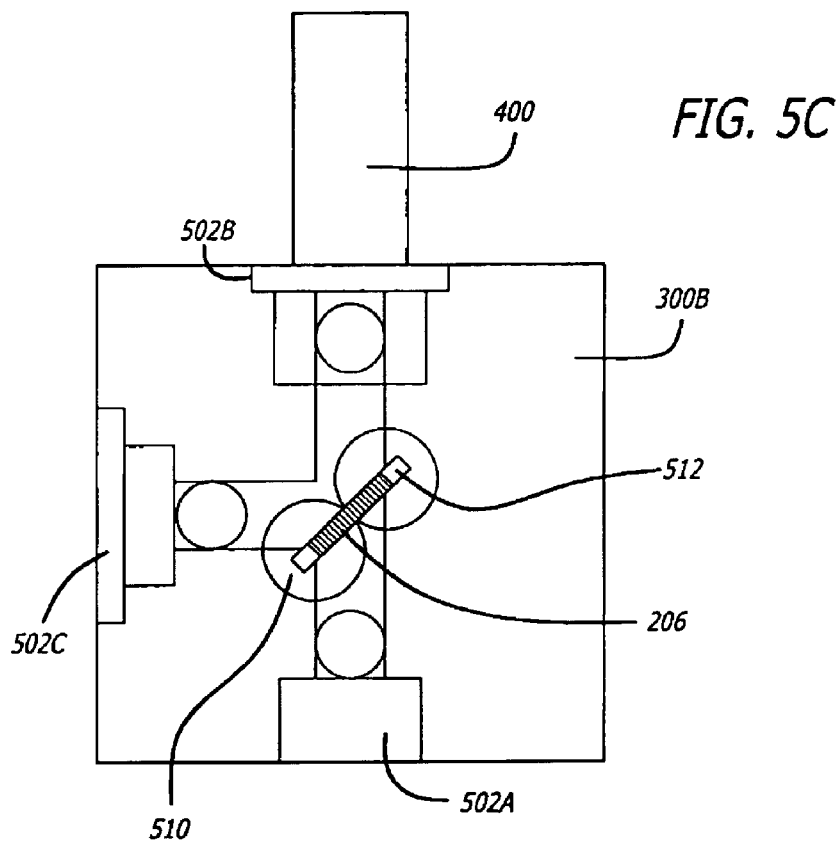

In FIG. 5C, a top view of the optical block 300B, the optical port assembly 400 is coupled into the opening 502B of the optical block 300B. The optical filter 206 is inserted into the opening 510 of the optical block 300B to rest in the slot 512. The slot 512 is clear of additional material or optically transparent so that light may propagate along the light paths of the optical axes. An epoxy or glue may be used to glue the optical filter 206 in place within the slot 512.

Figure 5D:
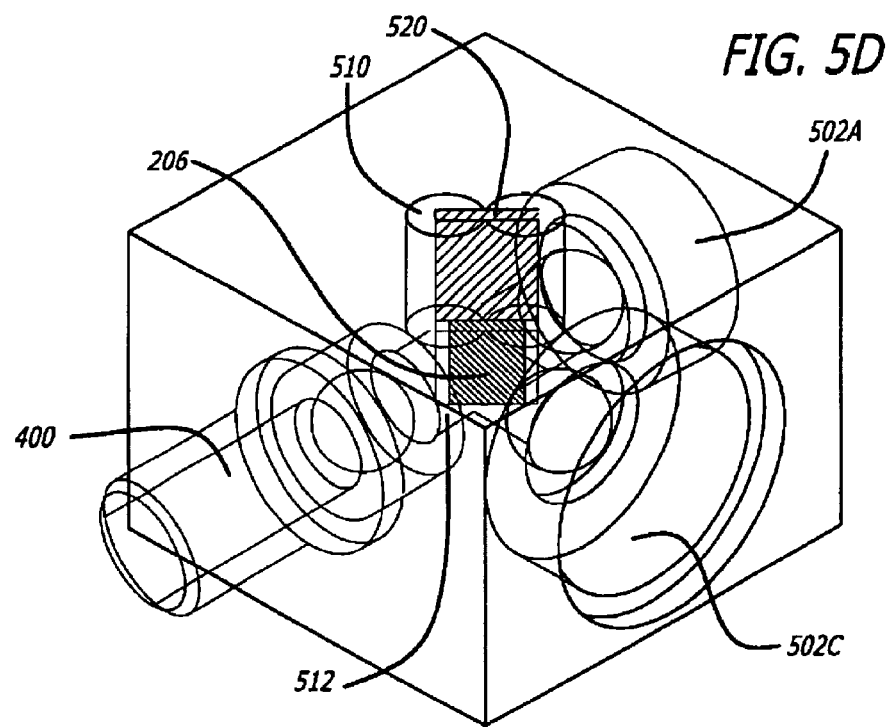

In FIG. 5D, a second perspective view rotated from the first, a stopper 520 is slid into the opening 510 to rest on top of the optical filter 206 and hold it in place within the slot 512. A glue or epoxy may be used to hold the stopper 520 in place and close off the opening 510. Otherwise, the stopper 520 may be friction fit into the opening 510.

Figure 5E:
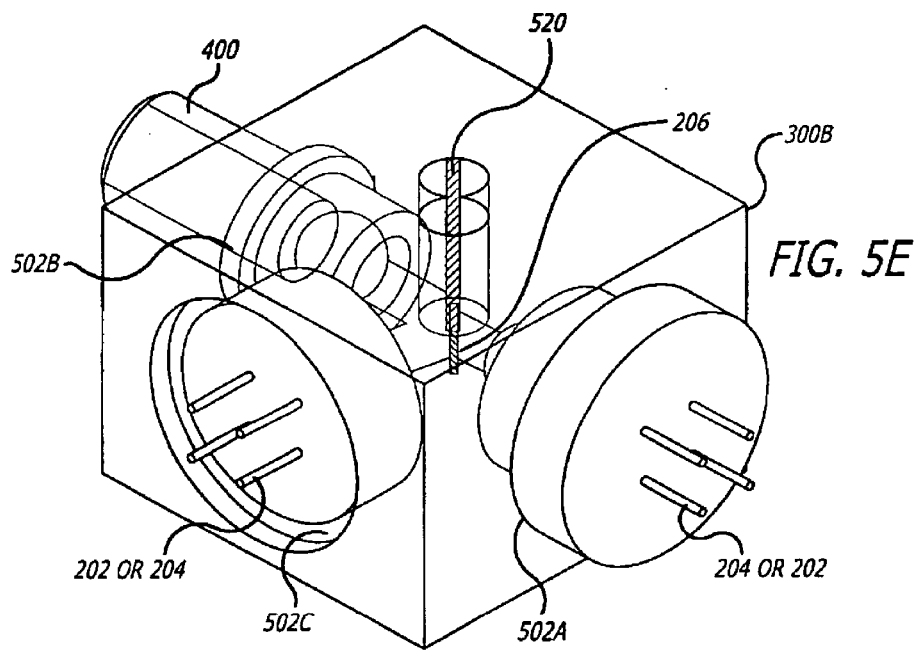

In FIG. 5E, the light source 202 and the light receiver 204 are coupled into openings of the optical block 300B and aligned therein. In one embodiment, the light source 202 and the light receiver 204 are coupled into openings 502A and 502C respectively. In another embodiment, the light source 202 and the light receiver 204 are coupled into openings 502C and 502A respectively. The light source 202 and the light receiver 204 may be coupled into openings of the optical block 300B using an epoxy or glue, aligned and allowed to cure in a fixed position. Alternatively, the light source 202 and the light receiver 204 may be aligned and welded in the openings or ports of the optical block 300B.

The optical subassembly (i.e., the optical block including the optical filter and optoelectronic devices) are assembled into a higher assembly which may be referred to as a fiber optic module, an optical data link, an optical transceiver, a bi-directional transceiver, or a bi-directional fiber optic transceiver module.

FIGS. 6A–6F illustrate an exemplary assembly of a bi-directional optical transceiver 600 including an embodiment of the optical block 200, such as optical block 300A or optical block 300B, in order to provide bi-directional optical communication over a single optical fiber. The assembly of the bi-directional optical transceiver 600 can be considered to include a mechanical subassembly, an electrical subassembly, and the optical subassembly. The optical subassembly may interface with a fiber optic connector of the single optical fiber.

The optical subassembly can be considered to have three optical ports. A first port may have an optical ferrule attached or coupled thereto to interface with the single optical fiber. A second port may have a light source coupled thereto. A third port may have a light receiver coupled thereto. In an alternate embodiment, the second port may have a light receiver coupled thereto while the third port has a light source coupled thereto. Within each port is a lens. The first lens and the second lens within the first port and second port respectively are aligned along the same optical axis. The optical axis of the third lens within the third port may be substantially perpendicular to the optical axis of the first lens and the second lens.

Figure 6A:
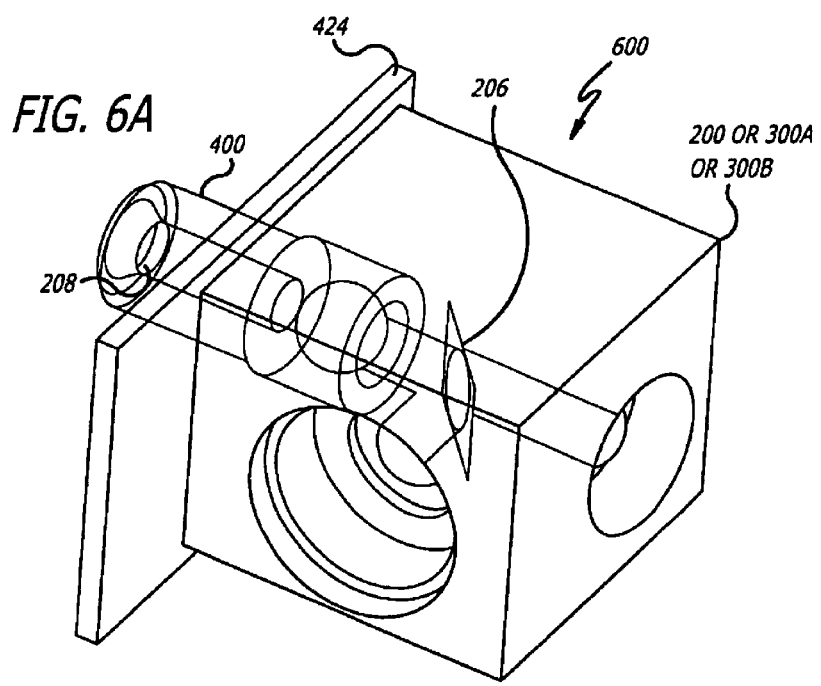

In FIG. 6A, a ferrule 208 is coupled to the optical port assembly 400 of the optical block or OSA 200, 300A or 300B. The optical block 200, 300A or 300B includes the optical filter 206 to reflect one center wavelength of light and allow transmission of a different center wavelength of light.

Figure 6B:
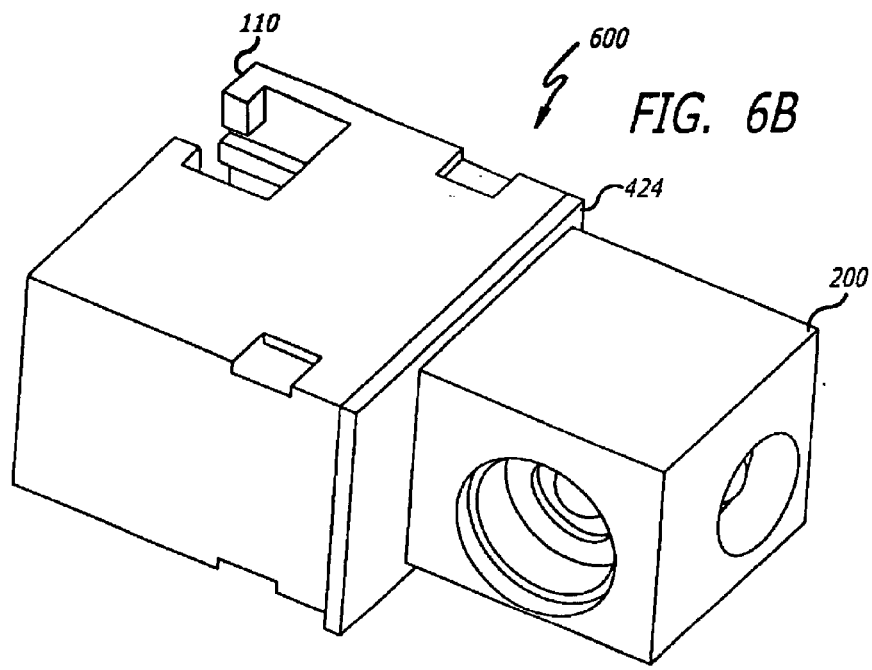

In FIG. 6B, a nose assembly or fiber optic receptacle 110 is coupled to the optical subassembly (OSA) or optical block 200, 300A, or 300B at the flange 424 or side thereof. The nose assembly 110 is for receiving a fiber optic connector, such as an LC, SC or MU standard fiber optic connector.

Figure 6C:
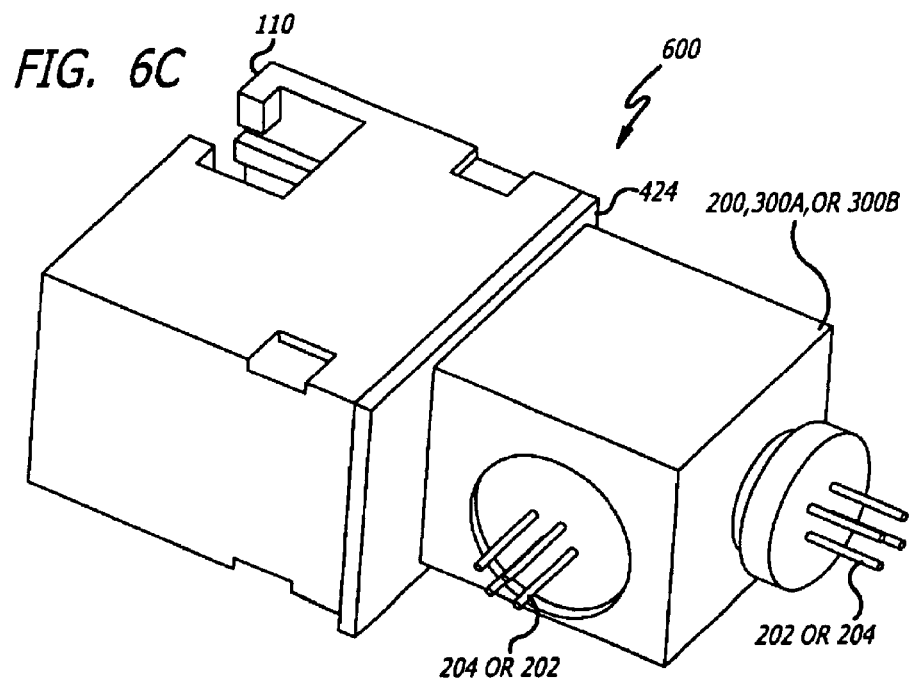

In FIG. 6C, the light source or optical transmitter 202 and the light receiver or optical receiver 204 are coupled respectively into the transmitter port and receiver port openings in the optical block and aligned to the ferrule 208 and nose assembly 110.

In FIG. 6D, a printed circuit board (PCB) 600 with transmitter electronics 602 and receiver electronics 604 or combinations thereof (forming the electrical subassembly (ESA)) is coupled to the light source or optical transmitter 202 and the light receiver or optical receiver 204 by soldering using throughhole connections to the pins 606 or a straddle mount connection between pins 606 and the traces on the PCB 600. The transmitter electronics 602 and the receiver electronics 604 includes electronic devices such as a laser driver IC, a receiver amplifier IC, resistors, capacitors, etc, populated.

To transceive electrical signals with a host system, the PCB 608 may include an edge connection, input/output electrical interface pins 608, or an electrical connector coupled thereto. The I/O pins 608 may be soldered or otherwise coupled to the PCB 600 for a fixed or non-pluggable type of optical transceiver. Alternatively, the PCB 600 may include pads 610 at an edge or tongue of the PCB 600 to form an edge connection or alternatively a pluggable connector to allow pluggability into an edge connector or a second pluggable connector respectively of a host printed circuit board.

Additionally, signal, power, and ground pads, contacts or electrical traces can have differing offset or staggering from one another and the edge of the PCB in order to provide hot pluggability of the optical transceiver. Thus when plugging into a powered up or hot host system, the ground connection is established first, the power connection second, and the signal connections last. Alternatively, a hot pluggable electrical connector can be attached to the PCB 600 of the electrical subassembly which has the offset or staggering signal pins from the power and ground pins.

In FIG. 6E, a cover or housing 620 of the bi-directional optical transceiver 100 is coupled around the optical block 200, 300A, or 300B and the PCB 600 to protect the components therein. The cover or housing 620 may include one or more tabs to attach to the PCB 600 and/or other components of the bi-directional optical transceiver. The cover or housing 620 may be made of plastic, metal or a metalized plastic. A metal or metalized cover may provide ESD protection and EMI shielding if grounded.

Figure 6F:
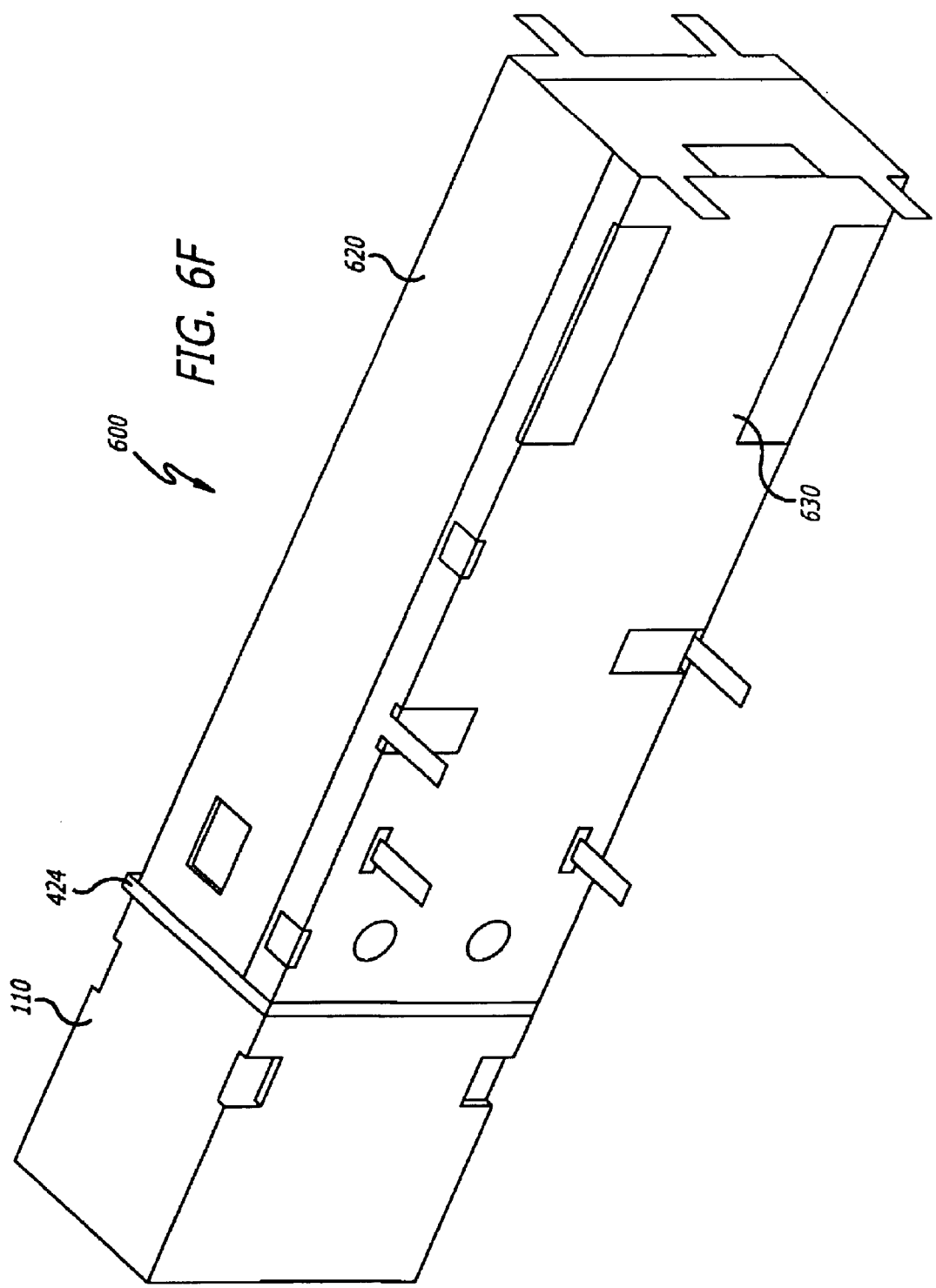

In FIG. 6F, a bottom side view, a base or bottom cover 630 may be attached to the subassembly of the bi-directional optical transceiver 100 to further enclose the optical block 200, 300A, or 300B and the PCB 600 in order to protect the components therein. The base or bottom cover 630 may be formed of plastic, metal or a metalized plastic.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Rather, the invention should be construed according to the claims that follow below.

What is claimed is:

1. A bi-directional optical transceiver module for bi-direction optical communication over a single optical fiber, the bi-directional optical transceiver module comprising:

an optoelectronic transmitter to generate a first light beam to couple into the single optical fiber;

an optoelectronic receiver to receive a second light beam decoupled from the single optical fiber;

an optical block having a first opening, a second opening, and an optical filter, the optoelectronic transmitter coupled into the first opening to form a first optical axis, the optoelectronic receiver coupled into the second opening to form a second optical axis, the single optical fiber aligned with the first optical axis, the optical filter to pass through the first light beam on the first optical axis from the optoelectronic transmitter into the single optical fiber and to redirect the second light beam from the single optical fiber on the first optical axis into the second optical axis and the optoelectronic receiver;

a printed circuit board (PCB) coupled to the optoelectronic transmitter and the optoelectronic receiver, the printed circuit board to couple to a host system and transceive electrical signals, the printed circuit board including a connector to couple to a connector of the host system; and a fiber optic receptacle to receive and hold a connecter on the single optical fiber aligned with the first optical axis;

wherein the optical block is an integrated optical block having a third opening for insertion of the optical filter with a slot at one end thereof, the slot to receive the optical filter.

2. The bi-directional optical transceiver module of claim 1 further comprising: a cover coupled around the printed circuit board.

3. The bi-directional optical transceiver module of claim 1 further comprising: a flange coupled between the optical block and the fiber optic receptacle.

4. The bi-directional optical transceiver module of claim 1, wherein the first optical axis is substantially perpendicular to the second optical axis.

5. The bi-directional optical transceiver module of claim 1, wherein
the first light beam has a first wavelength,
the second light beam has a second wavelength, and
the first light beam differs from the second wavelength of the second light beam.

6. The bi-directional optical transceiver module of claim 5, wherein
the first wavelength to allow the first light beam to pass through the optical filter along the first optical axis,
the second wavelength to cause the optical filter to redirect the second light beam from the first optical axis to the second optical axis.

7. The bi-directional optical transceiver module of claim 1, wherein the printed circuit board includes pins to couple to a host printed circuit board of the host system.

8. The bi-directional optical transceiver module of claim 1, wherein the printed circuit board includes an edge connection to couple to an edge connector of the host system.

9. The bi-directional optical transceiver module of claim 8, wherein the edge connection includes staggered ground, power and signal pads to provide hot pluqgability when coupling to the edge connector of the host system.

10. The bi-directional optical transceiver module of claim 1, wherein the optical block is a block of solid material.

11. The bi-directional optical transceiver module of claim 10, wherein the solid material is selected from the group consisting of plastic, glass, metal and ceramic.

12. The bi-directional optical transceiver module of claim 1, wherein the optical block further has a lens to optically focus the first light beam into the single optical fiber and to optically focus the second light beam out from the single optical fiber to the optical filter.

13. A bi-directional optical transceiver module for bi-direction optical communication over a single optical fiber, the bi-directional optical transceiver module comprising:

an optoelectronic transmitter to generate a first light beam to couple into the single optical fiber;

an optoelectronic receiver to receive a second light beam decoupled from the single optical fiber;

an optical block having a first a opening, a second opening, and an optical filter, the optoelectronic transmitter coupled into the first opening to form a first optical axis, the optoelectronic receiver coupled into the second opening to form a second optical axis, the single optical fiber aligned with the first optical axis, the optical filter to pass through the first light beam on the first optical axis from the optoelectronic transmitter into the single optical fiber and to redirect the second light beam from the single optical fiber on the first optical axis into the second optical axis and the optoelectronic receiver;

a printed circuit board (PCB) coupled to the optoelectronic transmitter and the optoelectronic receiver, the printed circuit board to couple to the host system and transceive electrical signals, the printed circuit board including a connector to couple to a connector of the host system; and a fiber optic receprtacle to receive and hold a connector on the single optical fiber aligned with the first optical axis;

wherein the optical block is a clam shell optical block having a first half and a second half coupled together along a diagonal, forming a slot therebetween with the optical filter positioned therein.

14. The bi-directional optical tranceiver module of claim 13, wherein the first half and the second half of the optical block are a solid material selected from the group consisting of plastic, glass, metal, and ceramic.

15. An optical block to provide bi-directional optical communication over a single fiber, the optical block comprising:
   a block of solid material having a first opening, a second opening, a third opening, and a fourth opening with a slot formed in the end thereof;
   an optical filter inserted through the fourth opening and couple into the slot of the block of solid material, the optics filter to reflect light of a first wavelength and to pass light of a second wavelength,
   a first lens coupled into the first opening of the block of solid material, the first lens to optically focus light into the single optical fiber and to optically focus light out from the single optical fiber to the optical filter;
   a second lens coupled into the second opening of the block of solid material, the second lens to optically focus light from a light transmitter to the optical filter; and,
   a third lens coupled into the third opening of the block of solid material, the third lens to optically focus light from the optical filter to a light receiver.

16. The optical block of claim 15, wherein the block of solid material is a single piece to form an integrated optical block.

17. The optical block of claim 15, wherein the first opening to receive the light transmitter and the second opening to receive the light receiver.

18. The optical block of claim 15, wherein
   the light of the first wavelength from the single optical fiber and focused by the first lens reflected by the optical filter to the third lens and into the light receiver, and
   the light of the second wavelength from the light transmitter and focused by the second lens paased through the optical filter to the first lens and into the single optical fiber.

19. The optical block of claim 15, wherein
   the light of the second wavelength from the single optical fiber and focused by the first lens passed through the optical filter to the third lens and into the light receiver, and
   the light of the first wavelength from the light transmitter and focused by the second lens reflected by the optical filter to the first lens and into the single optical fiber.

20. The optical block of claim 15, wherein the optical filter oriented within the optical block on an optical axis to reflect the light of the first wavelength at an angle between the first lens and the second lens.

21. The optical block of claim 15, wherein the optical filter oriented within the optical block on an optical axis to reflect the light of the first wavelength at an angle between the first lens and the third lens.

22. The optical block of claim 15, wherein the block of solid material is selected from the group consisting of plastic, glass, metal, and ceramic.

23. A bi-directional optical transceiver for light transmission and light reception over a single optical fiber, the bi-directional optical transceiver comprising:
   an optical block having an optical fiber port to align with the single optical fiber, a transmitter port to accept a light transmitter, a receiver port to accept a light receiver, a slot to receive an optical filter, a first lens in the optical fiber port, a second lens in the transmitter port, and a third lens in the receiver port,
   the light transmitter coupled into the transmitter port, of the optical block;
   the light receiver coupled into the receiver port of the optical block;
   the optical filter coupled into the slot of the optical block, the optical filter transmissive to a first light beam having a first wavelength and reflective to a second light beam having a second wavelength;
   wherein the optioal block is a clam shell optical block having a first half and a second half coupled together along a diagonal, forming the slot therebetween with the optical filter positioned therein.

24. The bi-directional optical transceiver of claim 23, wherein
   the first light beam to be generated by the light transmitter,
   the second light beam to be received by the light receiver, and
   the optical filter oriented within the optical block on an optical axis to reflect the second light beam of the second wavelength at an angle between the first lens and the third lens and to pass the first light beam of the first wavelength between the first lens and the second lens.

25. The bi-directional optical transceiver of claim 23, wherein
   the first light beam to be generated by the light transmitter,
   the second light beam to be received by the light receiver, and
   the optical filter oriented within the optical block on an optical axis to reflect the second light beam of the second wavelength at an angle between the first lens and the second lens and to pass the first light beam of the first wavelength between the first lens and the third lens.

26. The bi-directional optical transceiver of claim 23 further comprising:
   a printed circuit board (PCB) coupled to the light transmitter and the light receiver, the printed circuit board to couple to a host system and transceive electrical signals between the host system and the light transmitter and the light receiver; and
   a fiber optic receptacle to receive and hold the single optical fiber aligned with the optical fiber port of the optic block.

27. The bi-directional optical transceiver of claim 26 further comprising: a cover coupled around the printed circuit board.

28. The bi-directional optical transceiver of claim 27 further comprising: a flange coupled between the optical block and the fiber optic receptacle.

29. An optical block for a bi-directional fiber optic transceiver, the optical block comprising:
   an optical port assembly including a hollow cylindrical body having a first opening at a first end, a second opening at second end, and a first ball lens coupled into the second opening, the first opening to receive a fiber ferrule, the first ball lens to couple light between the optical block and a single optical fiber;
   a first optical block half having a first opening to receive the optical port assembly, a second opening to receive a light source, a second ball lens in the second opening, and a first diagonal plane with a slot extending therefrom;

an optical filter coupled into the slot of the first optical block half, the optical filter transmissive to at least a first wavelength of light and reflective to at least a second wavelength of light differing from the first; and, a second optical block half having a second diagonal plane coupled to the first diagonal plan of the first optical block half, a third opening to receive a light receiver, and a third ball lens in the third opening.

30. The optical block of claim 29, wherein the first optical block half and the second optical block half snap together.

31. The optical block of claim 29, wherein the first optical block half and the second optical block half are glued together.

32. The optical block of claim 29 further comprising a flange coupled to the first optical block half, the flange to couple the optical block in alignment with a fiber optic receptacle.

33. The optical block of claim 29, wherein the optical filter to pass the light of the first wavelength and to reflect the light of the second wavelength.

34. The optical block of claim 29, wherein the first optical block half and the second optical block half are a solid material.

35. The optical block of claim 34, wherein the solid material is selected from the group consisting of plastic, glass, metal, and ceramic.

36. An optical block for a bi-directional fiber optic transceiver the optical block comprising:

an integrated block of solid material having a first opening, a seoond opening with a second ball lens, a third opening with a third ball lens, a slot formed along light paths therein, and a slot opening associated with the slot;

an optical port assembly coupled into the first opening of the optical block, the optical port assembly including a hollow cylindrical body having a first opening at a first end, a second opening at a second end, and a first ball lens coupled into the second opening at the second end, the first opening at the first end to receive a fiber ferrule, the first ball lens to couple light between the optical block and a single optical fiber;

an optical filter inserted through the slot opening and coupled into the slot of the integrated block, the optical filter transparent to at least a first wavelength of light and reflective to at least a second wavelength of light differing from the first;

a stopper coupled into the slot opening to hold the optical filter in place within the slot.

37. The optical block of claim 36, wherein the stopper is epoxied in place within the slot opening.

38. The optical block of claim 36, wherein the optical filter to pass the light of the first wavelength and to reflect the light of the second wavelength.

39. The optical block of claim 36, wherein the optical filter is expoxied in place within the slot.

40. The optical communication system of claim 38, wherein the solid material is selected from the group consisting of plastic, glass, metal, and ceramic.

41. A bi-directional optical transceiver module for bi-direction optical communication over a single optical fiber, the bi-directional optical transceiver module comprising:

an optoelectronic transmitter to generate a first light beam to couple into the single optical fiber;

an optoelectronie receiver to receive a second light beam decoupled from the single optical fiber:

an optical block having a first opening, a second opening, and an optical filter, the optoelectronic receiver coupled into the first opening to form a first optical axis, the optoelectronic transmitter coupled into the second opening to form a second optical axis, the single optical fiber aligned with the first optical axis, the optical filter to redirect the first light beam on the second optical axis from the optoelectronic transmitter into the first optical axis and the single optical fiber, the optical filter to pass through the second light beam from the single optical fiber on the first optical axis into the optoeleotronic receiver;

a printed circuit board (PCB) coupled to the optoelectronic transmitter and the optoelectronic receiver, the printed circuit board to couple to a host system and transceive electrical signals;

a connector electrically connected to the printed circuit board to couple to a connector of the host system; and a fiber optic receptacle to receive and hold a connector on the single optical fiber aligned with the first optical axis;

wherein the optical block is an integrated optical block having a third opening for insertion of the optical filter with a slot at one end thereof, the slot to receive the optical filter.

42. The bi-directional optical transceiver module of claim 41, further comprising: a cover coupled around the printed circuit board.

43. The bi-directional optical transceiver module of claim 41 further comprising: a flange coupled between the optical block and the fiber optic receptacle.

44. The bi-directional optical transceiver module of claim 41, wherein the first optical axis is substantially perpendicular to the second optical axis.

45. The bi-directional optical transceiver module of claim 41, wherein the first light beam has a first wavelength, the second light beam has a second wavelength, and the first light beam differs from the second wavelength of the second light beam.

46. The bi-directional optical transceiver module of claim 45, wherein the second wavelength to allow the second light beam to pass through the optical filter along the first optical axis, the first wavelength to cause the optical filter to redirect the first light beam from the second optical axis to the first optical axis.

47. The bi-directional optical tranceiver module of claim 41, wherein the printed circuit board includes pins to couple to a host printed circuit board of the host system.

48. The bi-directional optical transceiver module of claim 41, wherein the printed circuit board includes a connector to couple to a connector of the host system.

49. The bi-directional optical transceiver module of claim 41, wherein the printed circuit board includes an edge connection to couple to an edge connector of the host system.

50. The bi-directional optical transceiver module of claim 49, wherein the edge connection includes staggered ground, power and signal pads to provide hot pluggability when coupling to the edge connector of the host system.

51. The bi-directional optical transceiver module of claim 41, wherein the optical block is a block of solid material.

52. The bi-directional optical transceiver module of claim 51, wherein the solid material is selected from the group consisting of plastic, glass, metal, and ceramic.

53. A bi-directional optical transceiver module for bi-direction optical communication over a single optical fiber, the bi-directional optical transceiver module comprising:

an optoelectronic transmitter to generate a first light beam to couple into the single optical fiber;

an optoelectronic receiver to receive a second light beam decoupled from the single optical fiber;

an optical block having a first opening, a second opening, and an optical filter, the optoelectronic receiver couped into the first evening to form a first optical axis, the optoelectronic transmitter coupled into the second opening to form a second optical axis, the single optical fiber aligned with the first optical axis, the optical filter to redirect the first light beam on the second optical axis from the optoelectronic transmitter into the first optical axis and the single optical fiber, the optical filter to pass through the second light beam from the single optical fiber on the first optical axis into the optoelectronic receiver;

a printed circuit board (PCB) coupled to the optoelectronic transmitter and the optoelectronic receiver, the printed circuit board to couple to a host system and transceive electrical signals;

a connector electrically connected to the printed circuit board to couple to a connector of the host system; and a fiber optic receptacle to receive and hold a connector on the single optical fiber aligned with the first optical axis;

wherein the optical block is a clam shell optical block having a first half and a second half coupled together along a diagonal, forming a slot therealong with the optical filter positioned therein.

\* \* \* \* \*